United States Patent
Miller et al.

(10) Patent No.: US 11,418,640 B2
(45) Date of Patent: Aug. 16, 2022

(54) ALUMINUM-AIR BATTERY UNITS AND STACKS

(71) Applicant: Phinergy Ltd., Lod (IL)

(72) Inventors: Yisrael Miller, Bat Ayin (IL); Dekel Tzidon, Hod Hasharon (IL); Avraham Yadgar, Kiryat Ono (IL)

(73) Assignee: PHINERGY LTD., Lod (IL)

( * ) Notice: Subject to any disclaimer, the term of this patent is extended or adjusted under 35 U.S.C. 154(b) by 263 days.

(21) Appl. No.: 16/763,250

(22) PCT Filed: Nov. 13, 2018

(86) PCT No.: PCT/IL2018/051224
§ 371 (c)(1),
(2) Date: May 12, 2020

(87) PCT Pub. No.: WO2019/092732
PCT Pub. Date: May 16, 2019

(65) Prior Publication Data
US 2021/0075078 A1    Mar. 11, 2021

Related U.S. Application Data

(60) Provisional application No. 62/584,955, filed on Nov. 13, 2017.

(51) Int. Cl.
*H04M 1/72463* (2021.01)
*H04W 4/80* (2018.01)
(Continued)

(52) U.S. Cl.
CPC .......... *H04M 1/72463* (2021.01); *B60Q 9/00* (2013.01); *H01M 12/02* (2013.01); *H01M 12/06* (2013.01);
(Continued)

(58) Field of Classification Search
CPC ...... H01M 50/20; H01M 12/02; H01M 12/06; H01M 50/1385
See application file for complete search history.

(56) References Cited

U.S. PATENT DOCUMENTS

| 4,115,626 A | | 9/1978 | Sauer et al. | |
| 5,049,457 A | * | 9/1991 | Niksa | H01M 6/50 |
| | | | | 429/188 |

(Continued)

FOREIGN PATENT DOCUMENTS

| CN | 1081394 C | 3/2002 |
| WO | WO 2012012558 | 1/2012 |

OTHER PUBLICATIONS

Search Report of International Application No. PCT/IL2018/051224 dated Feb. 26, 2019.
(Continued)

*Primary Examiner* — Olatunji A Godo
(74) *Attorney, Agent, or Firm* — Pearl Cohen Zedek Latzer Baratz LLP

(57) ABSTRACT

Aluminum-air battery units and stacks are provided with frames configured to mechanically support the anode of each unit, within a housing configured to support the frame and the air cathode(s) mechanically, sealably hold the electrolyte within the housing and in fluid communication with openings in the housing—forming one or two sided electrochemical cell in each unit. The frame comprises a protective strap configured to protect edges of the rectangular anode against corrosion by the electrolyte during operation, and also an external trapezoid shape that is configured to press the protective strap against the edges of the rectangular anode upon insertion of the frame with the anode into the housing. Various embodiments comprise, spacers between the anode and cathodes and grids supporting airways to the cathodes. In disclosed configurations, anode may be
(Continued)

replaced after electrolyte evacuation while maintaining the stack sealed and quickly ready for renewed operation.

20 Claims, 19 Drawing Sheets

(51) Int. Cl.
| | | |
|---|---|---|
| *B60Q 9/00* | (2006.01) | |
| *H04M 1/60* | (2006.01) | |
| *H04W 4/50* | (2018.01) | |
| *H04M 1/667* | (2006.01) | |
| *H04W 4/48* | (2018.01) | |
| *H04M 1/72412* | (2021.01) | |
| *H01M 50/138* | (2021.01) | |
| *H01M 50/20* | (2021.01) | |
| *H01M 12/02* | (2006.01) | |
| *H01M 12/06* | (2006.01) | |

(52) U.S. Cl.
CPC ....... *H01M 50/1385* (2021.01); *H01M 50/20* (2021.01); *H04M 1/6075* (2013.01); *H04M 1/667* (2013.01); *H04M 1/72412* (2021.01); *H04W 4/48* (2018.02); *H04W 4/50* (2018.02); *H04W 4/80* (2018.02)

(56) References Cited

U.S. PATENT DOCUMENTS

| | | | |
|---|---|---|---|
| 5,376,471 A | * | 12/1994 | Hunter .................. H01M 6/50 |
| | | | 429/81 |
| 2001/0009735 A1 | | 7/2001 | Yang et al. |
| 2010/0143807 A1 | | 6/2010 | Khasin et al. |
| 2016/0013529 A1 | | 1/2016 | Yadgar et al. |

OTHER PUBLICATIONS

European Search Report for EP application No. EP18876279.3, dated Jul. 29, 2021.

* cited by examiner

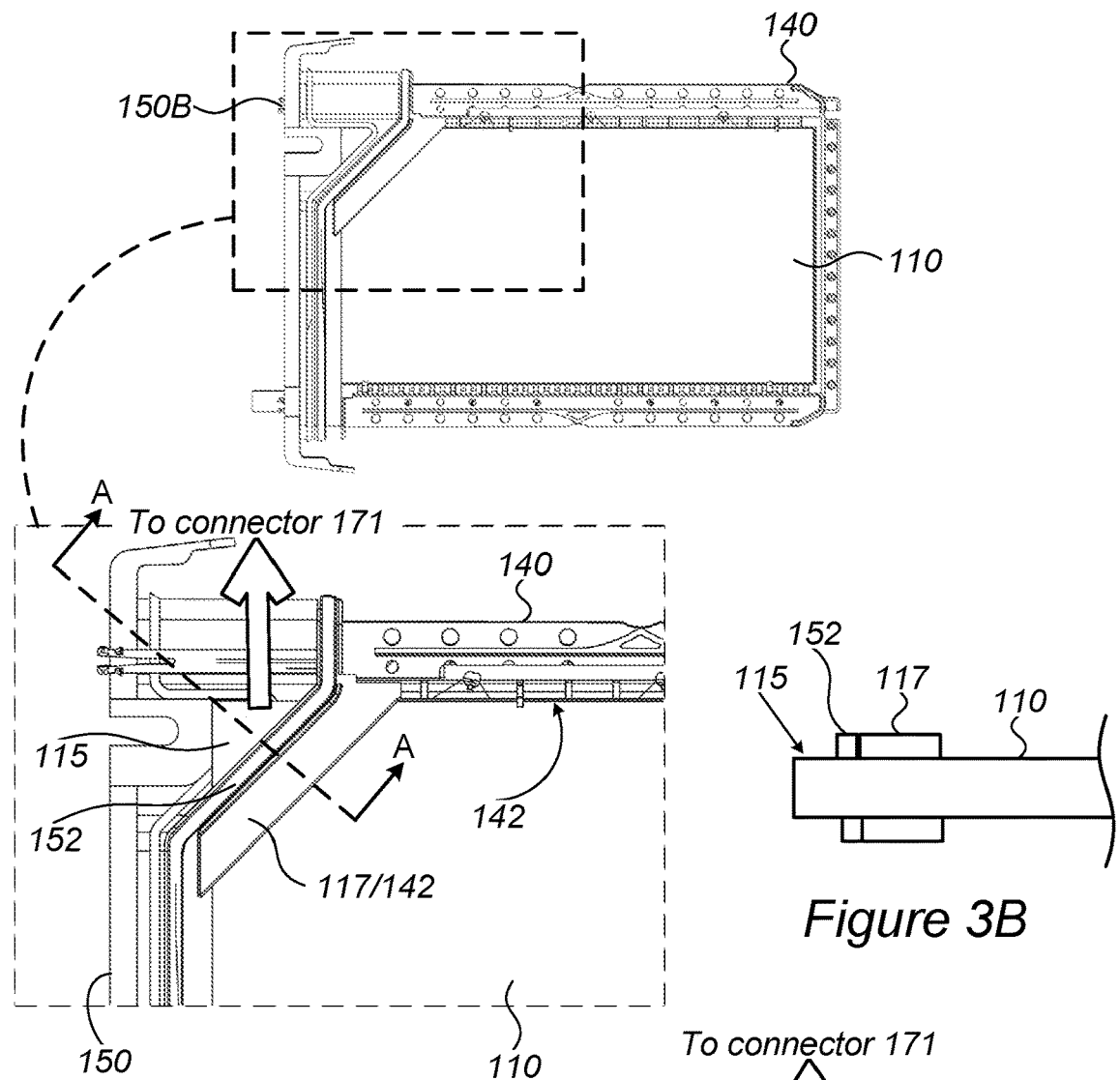
Figure 3A
Figure 3B
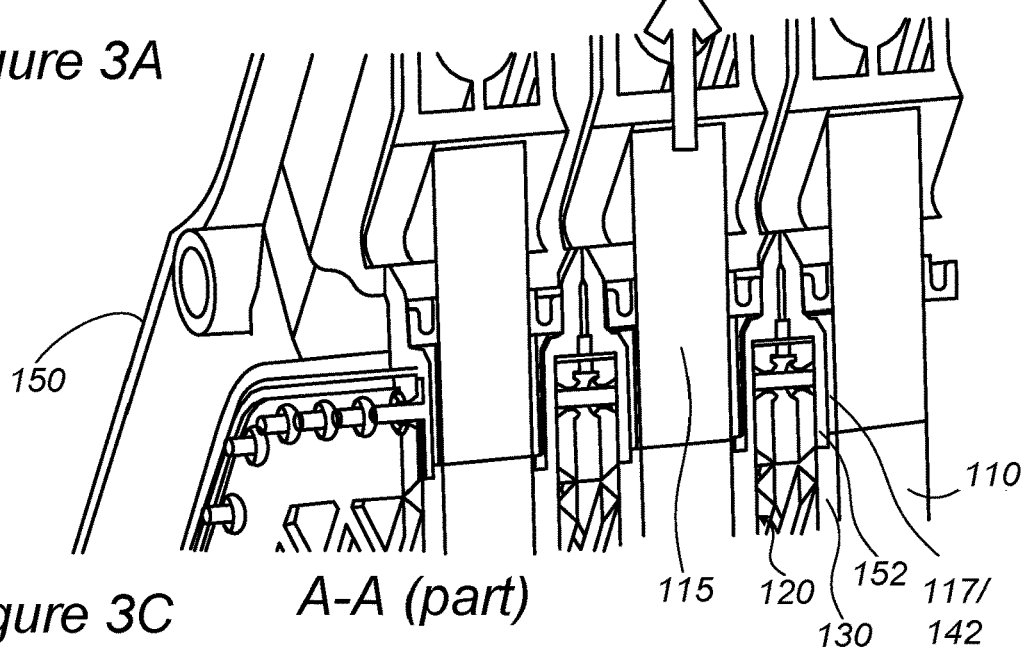
Figure 3C  A-A (part)

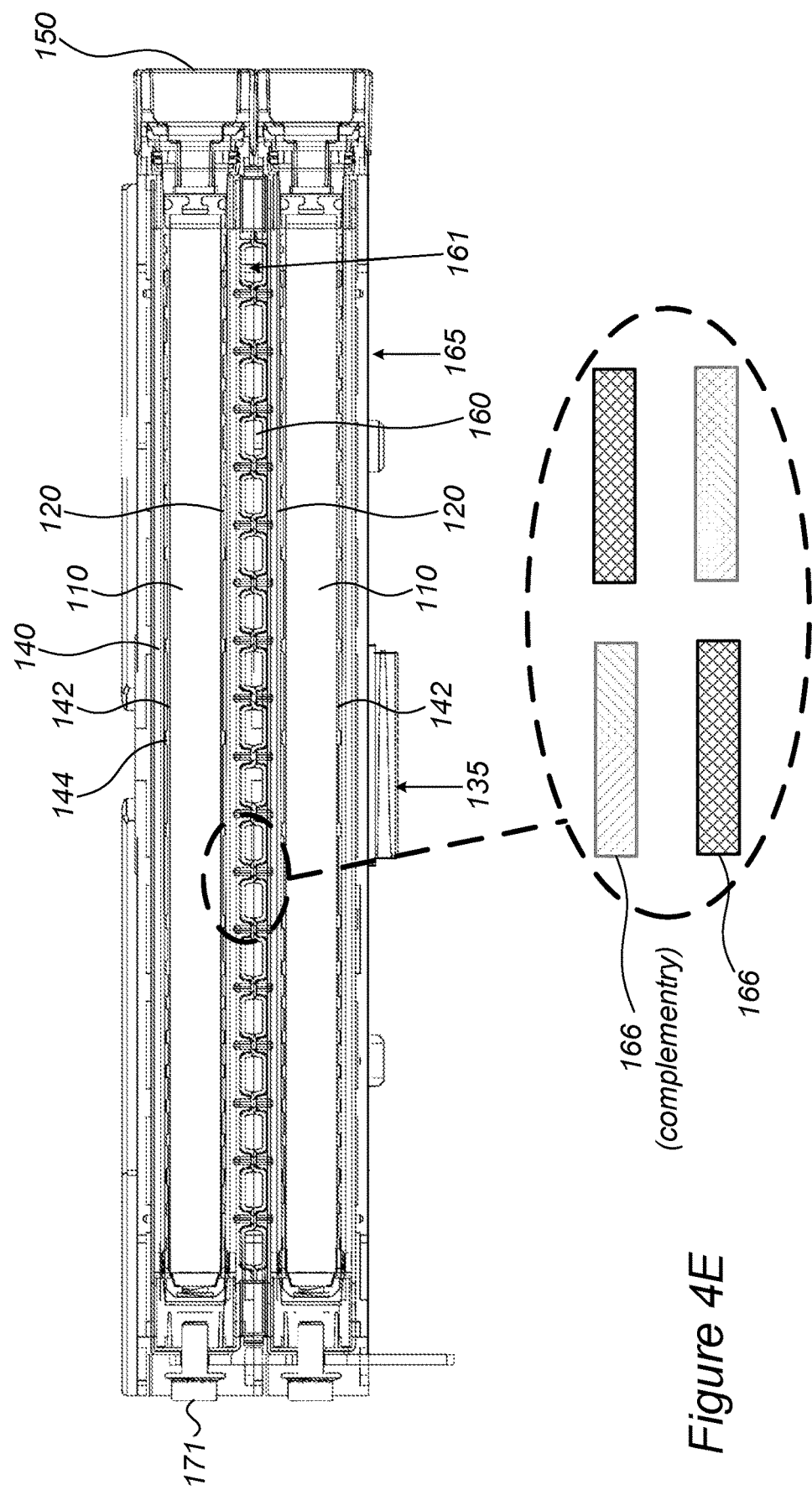

ALUMINUM-AIR BATTERY UNITS AND STACKS

CROSS-REFERENCE TO RELATED APPLICATIONS

This application is a National Phase Application of PCT International Application No. PCT/IL2018/051224, International Filing Date Nov. 13, 2018, entitled "Aluminum-Air Battery Units and Stacks", published on May 16, 2019 as International Patent Application Publication No. WO 2019/092732, claiming the benefit of U.S. Provisional Patent Application No. 62/584,955, filed Nov. 13, 2017, which is incorporated herein by reference in its entirety.

BACKGROUND OF THE INVENTION

1. Technical Field

The present invention relates to the field of energy storage, and more particularly, to construction of aluminum-air batteries.

2. Discussion of Related Art

Energy storage is a developing field with diverse solutions employing various electrochemical and structural configurations. One promising direction is aluminum-air batteries, in which aluminum anode material is consumed in the presence of alkaline electrolyte by an air cathode.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides an aluminum-air battery unit comprising: at least one aluminum-air electrochemical cell comprising a rectangular aluminum anode, at least one corresponding air cathode, and alkaline electrolyte, a frame configured to mechanically support the anode of the cell, and a housing configured to support mechanically the frame and the at least one air cathode and to sealably hold the electrolyte within the housing and in fluid communication with openings in the housing; wherein the frame comprises a protective strap configured to protect edges of the rectangular anode against corrosion by the electrolyte during operation, and wherein the frame has an external trapezoid shape that is configured to press the protective strap against the edges of the rectangular anode upon insertion of the frame with the anode into the housing.

These, additional, and/or other aspects and/or advantages of the present invention are set forth in the detailed description which follows: possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 3A-3H are high-level schematic illustrations of parts of aluminum-air battery units, according to some embodiments of the invention.

FIGS. 4A-4E are high-level schematic illustrations of various cathode side embodiments of aluminum-air battery units, according to some embodiments of the invention.

DETAILED DESCRIPTION OF THE INVENTION

Figure 1A:
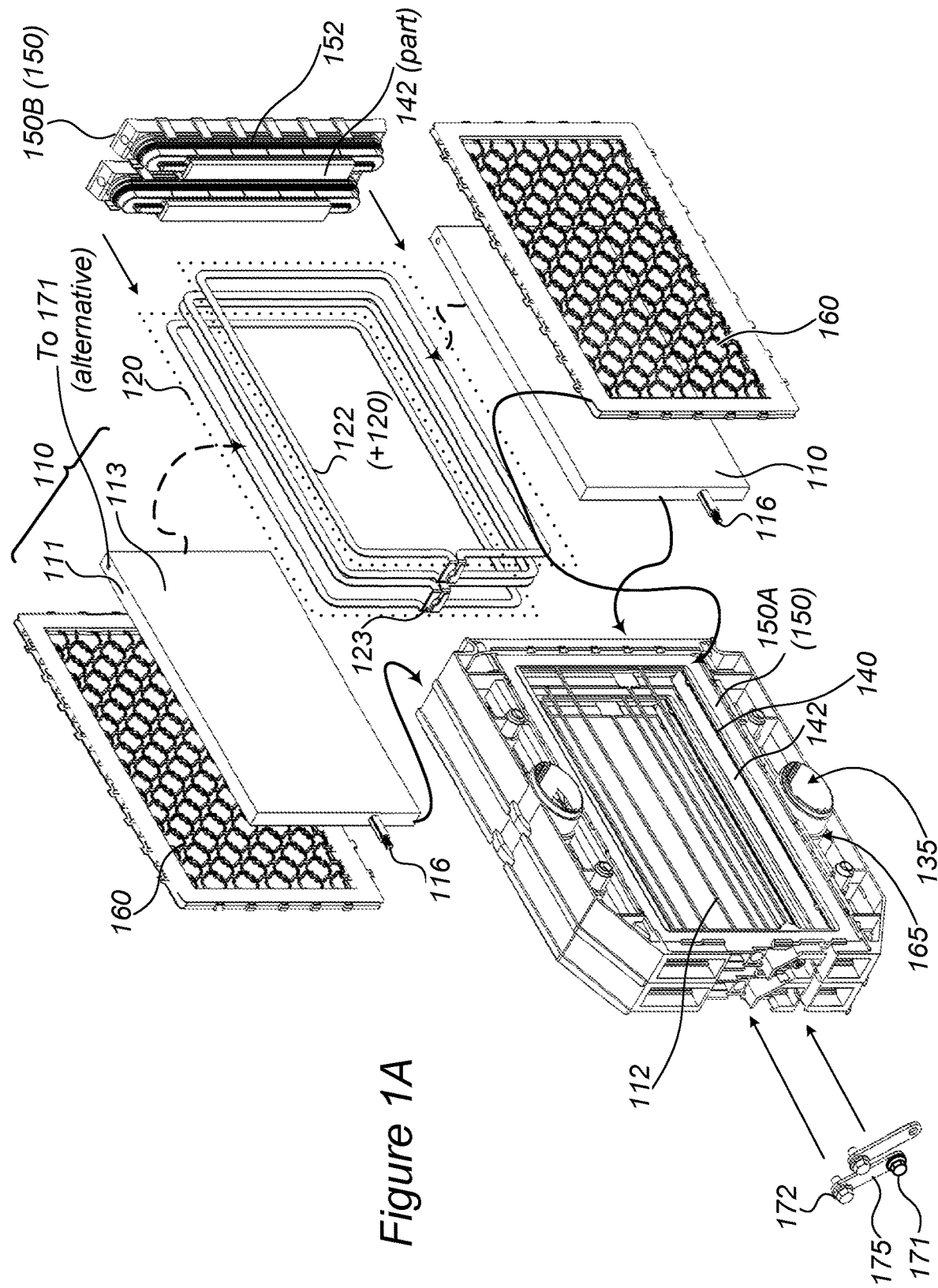
FIGS. 1A-1F and 2A-2D are high-level schematic illustrations of aluminum-air battery units, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanisms for constructing and interconnecting aluminum-air battery units to form batteries and thereby provide improvements to the technological field of energy storage and supply. Aluminum-air battery units and stacks are provided with frames configured to mechanically support the anode of each unit, within a housing configured to support the frame and the air cathode(s) mechanically, sealably hold the electrolyte within the housing and in fluid communication with openings in the housing—forming one or two sided electrochemical cell in each unit. The frame comprises a protective strap configured to protect edges of the rectangular anode against corrosion by the electrolyte during operation, and also an external trapezoid shape that is configured to press the protective strap against the edges of the rectangular anode upon insertion of the frame with the anode into the housing. Various embodiments comprise, spacers between the anode and cathodes and grids supporting airways to the cathodes. In disclosed configurations, anode may be replaced after electrolyte evacuation while maintaining the stack sealed and quickly ready for renewed operation.

Aluminum-air batteries (stacks) are typically composed of multiple units which are interconnected mechanically and electrically. The sealing between the units may be maintained along directions perpendicular to a plane of removed frame(s) and anode(s) to enable replacing anodes after depletion with new anodes while maintaining the configuration and sealing of the stack, allowing for quick reactivation of the stack without compromising its performance and further enabling simple maintenance of the stacks.

In the following figures, one or two battery units are shown to illustrate their spatial relation and connectivity.

Figure 1B:
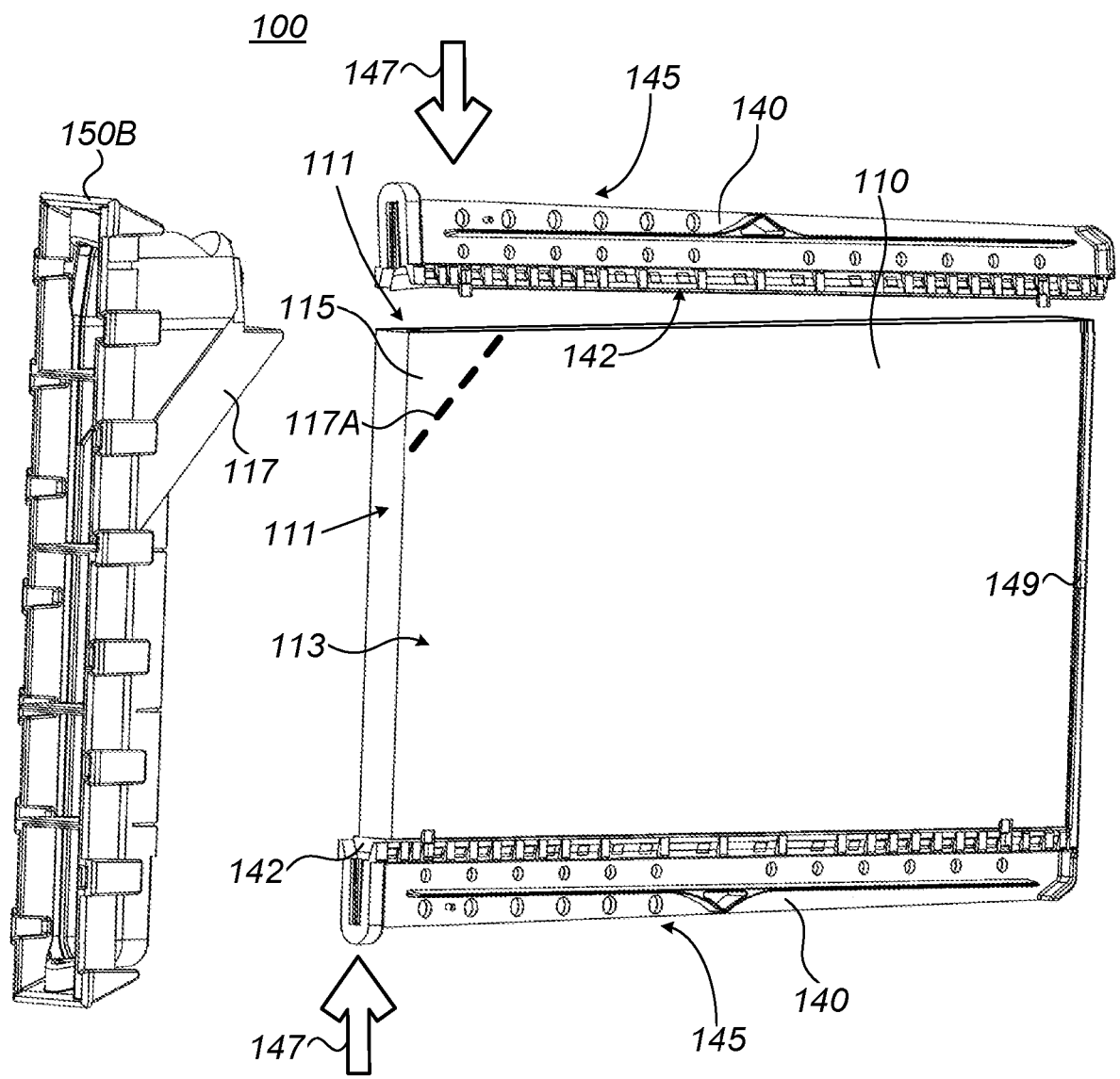
Figure 1C:
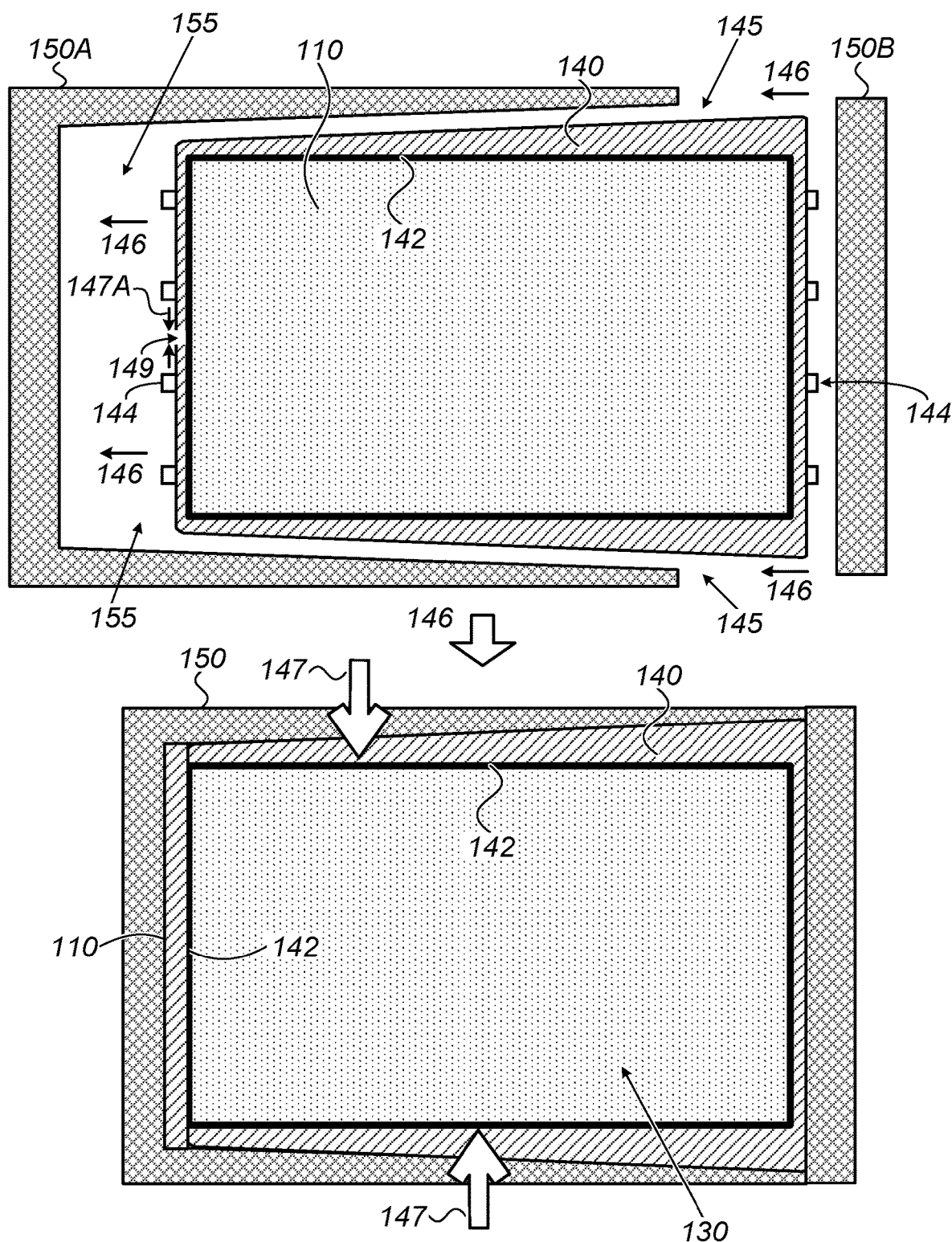
Figure 1D:
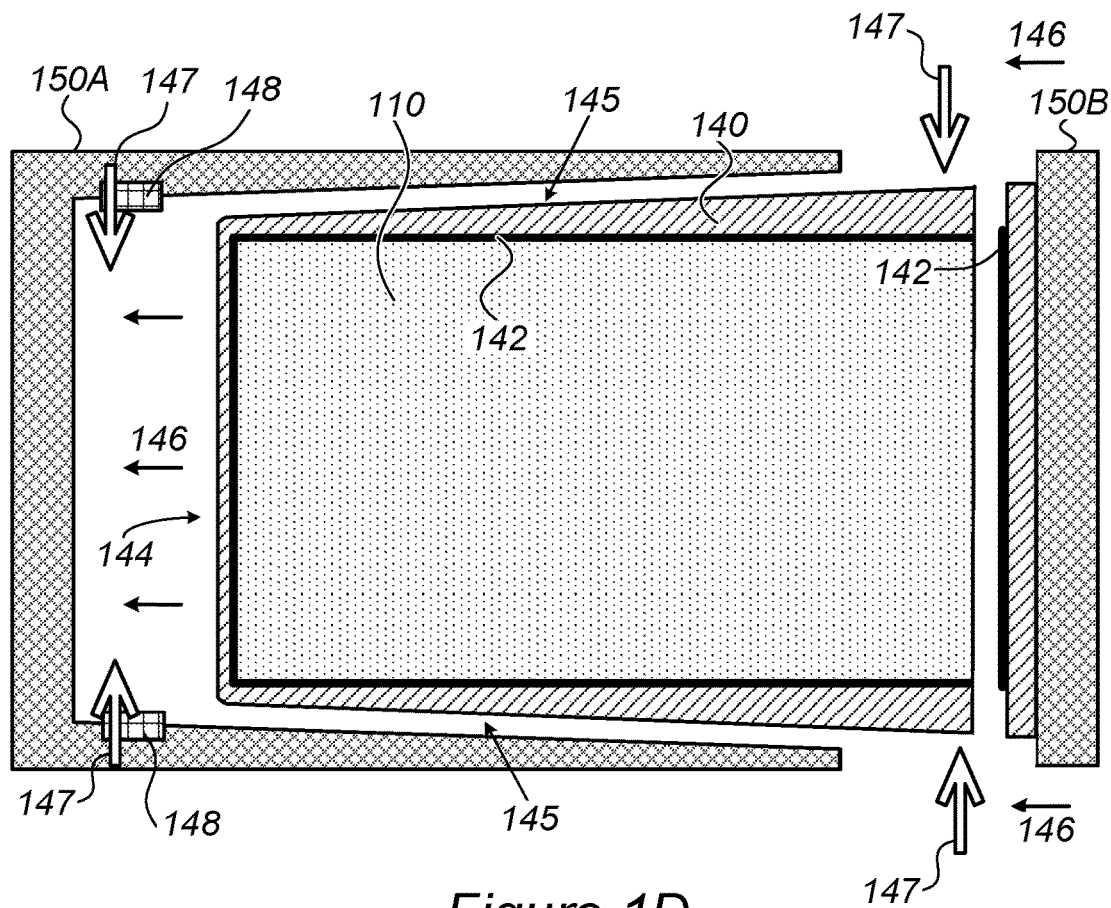
Figure 1E:
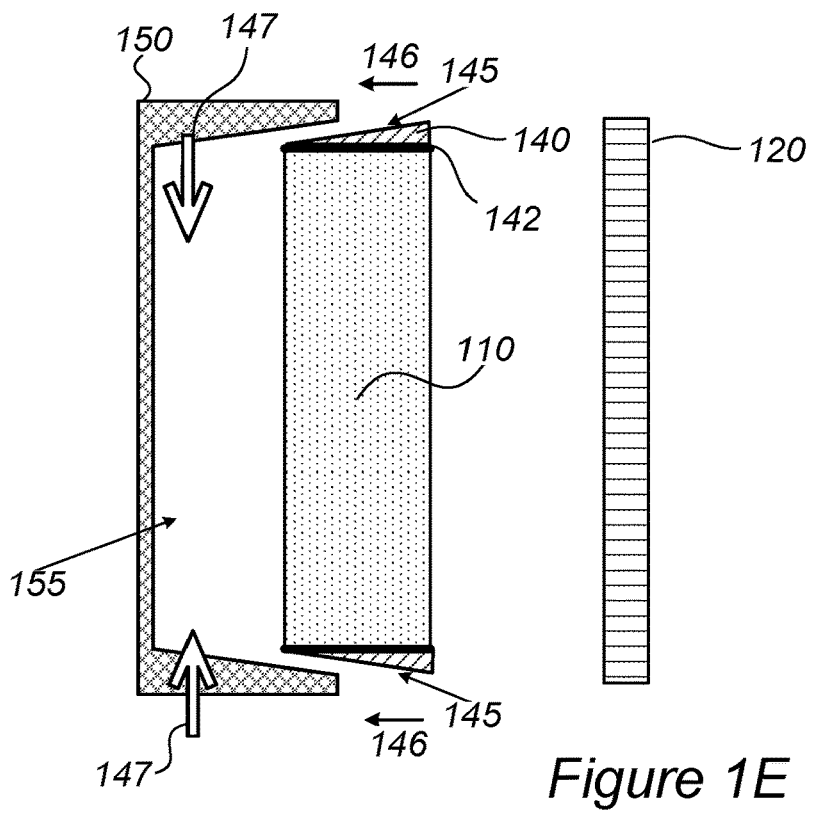
Figure 1F:
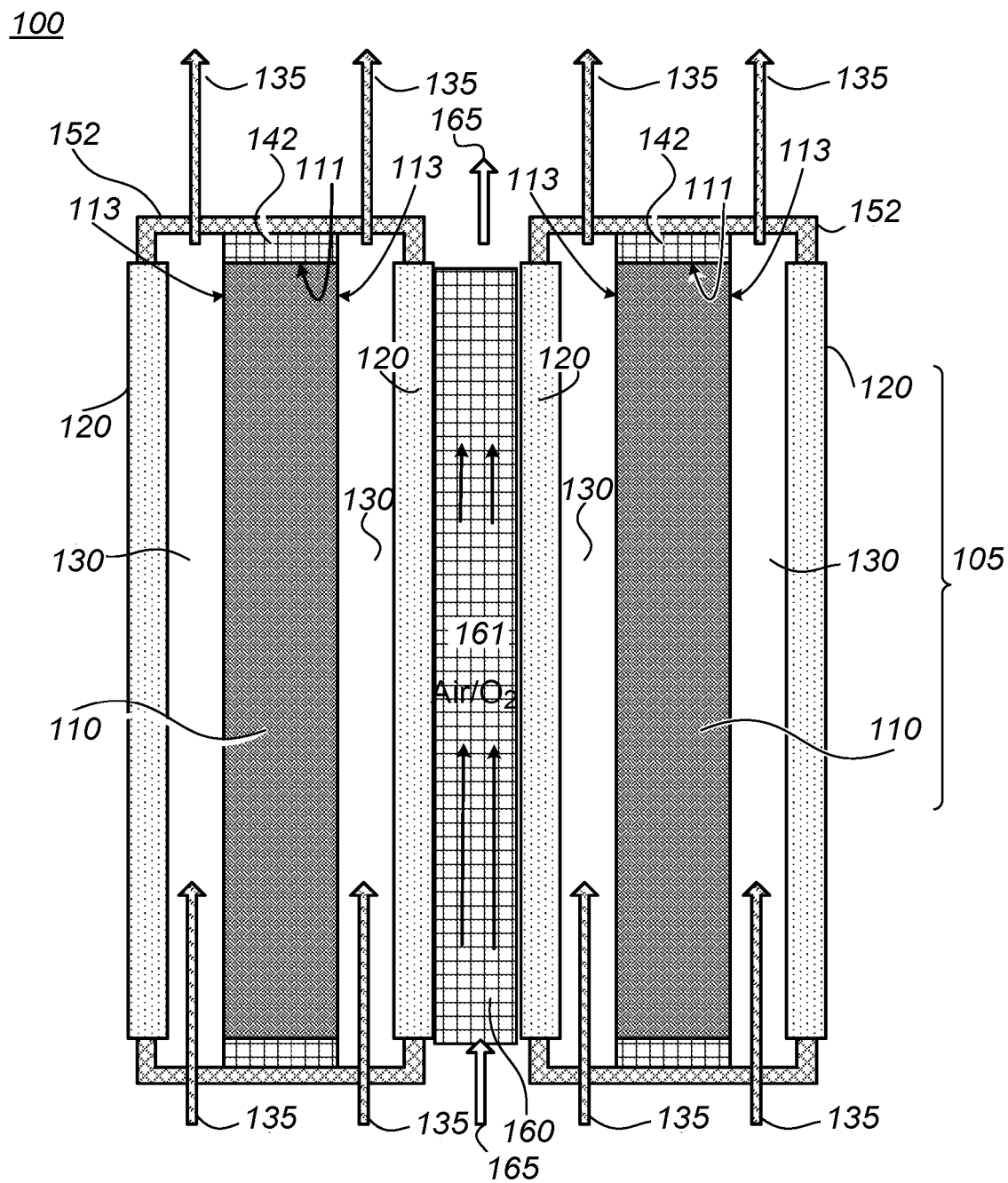

FIGS. 1A-1F are high-level schematic illustrations of aluminum-air battery units 100, according to some embodiments of the invention. FIG. 1A is a schematic perspective partially exploded view, FIG. 1B is a perspective detailed view, FIGS. 1C and 1D are highly schematic face views, FIG. 1E is a highly schematic side view and FIG. 1F is a highly schematic cross section of two units 100.

Aluminum-air battery unit 100 comprises an aluminum-air electrochemical cell 105 comprising a rectangular aluminum anode 110, at least one air cathode 120 and alkaline electrolyte 130 (see, e.g., a schematic notation of cell 105 in FIG. 1F). Aluminum-air electrochemical cell 105 is configured to produce electricity from the electrochemical reaction of aluminum from anode 110 with oxygen (e.g., from the air) that is catalyzed by air cathode(s) 120 in association with alkaline electrolyte 130 (e.g., KOH or NaOH). In various configurations, anode 110 may be part of one cell 105 with one air cathode (see e.g., schematic FIG. 1E) or part of two cells 105 (or cell compartments) with corresponding air cathodes 120 (see, e.g., schematic FIG. 1F). Alternatively of complementarily, electrochemical cell 105 in each unit 100 may be considered one-sided when including anode 110 and one air cathode 120, or two-sided when including anode 110 and two air cathodes 120 on either side thereof.

Battery unit 100 further comprises a frame 140 configured to mechanically support anode 110, and a housing 150 configured to mechanically support frame 140 and cathode(s) 120, and to sealably hold electrolyte 130 within housing 150 and in fluid communication with openings 135 in housing 150 through which electrolyte 130 is circulating through cell(s) 105 (delivered to and removed from the cell space holding electrolyte 130).

Frame 140 comprises a protective strap 142 configured to protect edges 111 of rectangular anode 110 against corrosion by electrolyte 130, particularly as a surface 113 is consumed during the operation of the aluminum air battery. Frame 140 has an external trapezoid shape 145, that is configured to press protective strap 142 against edges 111 of rectangular anode 110 upon insertion of frame 140 with anode 110 into housing 150. For example, the frame's trapezoid shape 145 may be configured to fit into a trapezoid cavity 155 in housing 150, as shown in FIGS. 1A-1E and as illustrated schematically in FIGS. 1C-E by arrows 146. It is noted that the trapezoid configuration may be implemented along a long side of anode 110 as illustrated e.g., in FIGS. 1A-1D and/or along a short side (thickness) of anode 110 as illustrated e.g., in FIG. 1E. In certain embodiments, the former may be used to implement electrochemical cells 105 on both sides of anode 110, with two corresponding air cathodes 120, while the latter may be used to implement a single electrochemical cell 105 on one side of anode 110, with one air cathode 120 and corresponding protection of the backside of anode 110 to prevent chemical and/or corrosion reactions thereof and operating cell 105 from one side of anode 110 facing air cathode 120.

FIG. 1A illustrates a partly exploded view of two attached units 100, including frame 140 with protective straps positioned in housing 150A (as part of housing 150, together with part 150B, see also FIG. 1D for a schematic illustration) while anodes 110 are shown separately. Cathodes 120 are shown schematically (only two of four cathodes are indicated by point-dashed lines), and are represented by their respective current collectors 122. Cathodes 120 are supported by grids 160 and attached to housing 150 (150A), as shown schematically by the curved arrows. The position of anodes 100 in frame 140 is indicated schematically by curved arrows and the relative position of anodes 110 with respect to cathodes 120 is shown by curved broken-line arrows, indicating two cathodes 120 per anode 110, to form two cells 105 per unit 100, as explained below. Sides 111 and surfaces 113 of anodes 110 are indicated, as well as an alternative option of attaching anode connector to triangular part 115 of anode 110 as in some embodiments presented below. Studs 116 are shown as being connected to anode connectors/fasteners 171 in the illustrated version, explained below in more details.

FIG. 1B illustrates a partly exploded view showing the complementary structure of frame 140 to anode 110 according to some embodiments. Advantageously, the trapezoid shape of frame 140 may be configured to enable using rectangular anodes 110 which are easy to produce and do not waste anode material (with respect, e.g., to trapezoid anodes). Frame 140 may comprise joints or parts that endow some flexibility to frame 140—for pressing frame 140 against sides 111 of anode 110 upon insertion of frame 140 into housing 150. For example, as shown schematically in FIG. 1B, frame 140 may comprise two disjunct parts which may each hold protective strap 142 and be pressed onto sides 111 of anode 110 upon insertion to housing 150 (e.g., closing of housing parts 150A and 150B).

FIG. 1B further illustrates seal 117, in some embodiments being part of housing 150 or housing part 150B, which, upon insertion of frame 140 and anode 110 into housing 150 or housing part 150B, is held against the edge of anode part 115 (e.g., by schematically illustrated tab or bar 117A) and seals it off and protects part 115 from electrolyte 130 in cell 105.

It is noted that in case of seal 117, the distinction between sealing elements that prevent electrolyte from leaking outside of cell 105 and protective elements that protect anode sides from contact with electrolyte 130 (that may result in parasitic reactions) depend on the geometric configuration and the state of anode 110, as explained below. Therefore, in the following discussion, the terms seal 117 and protective strap 117 are used interchangeably (as e.g., in FIGS. 3A-3C), and seal 117 is considered to include and/or function as both protective strap 117 and seal 152 in certain configurations (as e.g., in FIGS. 3G and 3H).

Schematic illustration FIG. 1F shows in a generalized cross section of two units 100 with anodes 110 having two corresponding pairs of cathodes 120 which are arranged in a back-to-back configuration, creating spaces for electrolyte 130 (in fluid communication with openings 135) between anode 110 and cathode 120 and spaces (airways) 161 for air or other oxygen-containing gas (in fluid communication with openings 165) between cathodes 120. The chambers containing anode 110 and two cathodes 120 are sealed (by a seal 152 of cells 105 shown very schematically in FIG. 1F, in which frame 140 and housing 150 are not shown, and see FIG. 1A for part of seal 152 on housing part 150B) to prevent leakage of electrolyte 130. During operation, surfaces 113 of anodes 110 are consumed to deliver energy electrochemically (with respect to air cathodes 120 that consume oxygen). Sides 111 of anodes 110 may be protected by strap(s) 142 that prevent or reduce electrolyte contact with anode material and thereby prevent or reduce anode material consumption on sides 111 (which may result in parasitic reactions and development of hydrogen).

In certain embodiments, housing 150 may comprise two parts 150A, 150B (see, e.g., FIGS. 1A, 1C and 1D) which are sealably and/or snuggly connected to each other to enclose frame 140. Advantageously, frame 140 protects and supports protective strap 142 during the enclosing thereof within housing 150 and provides a mechanically reliable interface between the external edge of frame 140 and the internal edge of housing 150. The enclosure of frame 140 within housing 150 (see arrows 146 in FIG. 1C) may involve some pressure applied against flexible elements 144 (located at the external periphery of frame 140 and/or located at the internal periphery of housing 150) which are configured to compensate for possible deviations in the dimensions of anode 110, frame 140 and/or housing 150 and ensure close fitting of frame 140 in housing 150. In certain embodiments, elastic elements 144 may be configured to be pressed against housing 150 upon insertion 146 of frame 140 thereto, and enhance a contact of protective strap 142 to edges 111 of anode 110. In various embodiments, the enclosure of frame 140 within housing 150 also presses (see arrows 147 in FIG. 1C) at least parts of protective strap 142 against anode edges 111 to ensure protection of the respective edges thereby. In certain embodiments, parts of protective strap 142 and/or additional protective straps (not shown) may be implemented on the receiving sides of parts of housing 150, in case frame 140 does not cover the full circumference (and all edges 111) of anode 110.

Protective strap 142 may comprise a circumferential strap or a combination of strap parts, some of which optionally attached to parts of housing 150, such as part 150B depicted schematically in FIG. 1D.

In certain embodiments, housing 150 may be configured to receive frame 140 by a click connection to external trapezoid shape 145 of frame 140 which is configured to apply the pressure on protective strap 142 (or parts thereof) against edges 111 of rectangular anode 110. In some embodiments, as illustrated schematically in FIGS. 1B-1E by arrows 147, various ways may be implemented to press protective strap 142 to anode edges 111 without damaging protective strap 142, to maintain the protection and moreover to enable simple extraction of frame 140 with anode 110 from housing 150. For example, protrusion(s) 148 may be set in housing 150 to press onto frame 140 at final stage of its insertion into housing 150 and/or part 150A of housing 150 may be attached to frame 140 in a way that applies pressure 147 onto protective straps 142. In some embodiments, as illustrated schematically in FIGS. 1A and 1D, parts of protective strap 142 (and possibly of frame 140) may be attached to part 150B of housing, e.g., to yield pressure on all four edges 111 of rectangular anode 110 upon insertion of frame 140 with anode 110 into housing 150. In some embodiments, gap(s) or flexible spacers 149 may be formed in frame 140 (see e.g., FIGS. 1C and 1B, respectively) to allow for pressing 147A (see FIG. 1C) of frame 140 to at least partly close gap(s) and/or spacer(s) 149 and thereby press protective strap 142 (or parts thereof) against edges 111 of rectangular anode 110

Housing 150 further comprise openings 135 for delivery of electrolyte 130 into and out of the space between anodes 110 and cathodes 120 defined for operating the electrochemical reactions of the battery, and openings 165 for delivery of air (or other gas) into and out of the space between cathodes 120 defined for provision of air to cathodes 120, as described in additional details below and as illustrated schematically in FIG. 1F. For example, electrolyte 130 and/or air may be delivered from below upwards into cells 105 and airways 161, respectively, to enable gas and heat release from these corresponding chambers. Cathodes 120 may be supported by grid 160 (shown schematically in FIG. 1F), discussed in further details below.

Cathodes 120 may be air cathodes, e.g., as taught by U.S. Pat. Nos. 8,142,938 and 9,941,516, incorporated herein by reference in their entirety, comprising a catalyst attached to a PTFE (Polytetrafluoroethylene) skin on a network to which a current collector is attached. Anodes 110 may be made of solid metal (e.g., aluminum) and/or alloys thereof. Alkaline electrolyte 130 may comprise KOH and/or NaOH, as non-limiting examples.

Frame 140 may be configured to be replaceable, with associate anode 110 and cathodes 120, within housing 150 and/or unit 100 (housing 150 with frame 140) may be replaceable within the assembled battery.

FIG. 1A further illustrates fasteners 171 of the anode contacts, and fasteners 172 of the cathode contacts, which are interconnected by tabs 175 for serial connection of consecutive cells. Fasteners 171 and 172 may comprise nuts, screws, spring loaded connectors, or other types of fastener. It is noted that the anode and cathode contacts may comprise parts thereof (e.g., part 115 of anode), separate elements such as cathode holder 123 (e.g., tab, segment or spring) shown e.g., in FIGS. 1A and 2B, and/or attached elements such as stud 116 or other connecting elements to anode 110, illustrated below. In various configurations, certain elements may function both as connectors and fasteners, and therefore electrode connectors and fasteners may be implemented by a single element.

In certain embodiments, battery unit 100 may further comprise at least one spacer 112 attached to housing 150 (or possibly to frame 140 or any other unit element) and configured to mechanically prevent contact between anode 110 and cathode 120 in case of negative pressure occurring upon emptying electrolyte 130 from unit 100 (e.g., by gravity or by pumping). Spacer(s) 112 may be configured in various ways, such as one or more thin rods, along one direction, two orthogonal directions or multiple directions in a plane between the surfaces of anode 110 and cathode 120, diagonal rods, serrated rods etc., to support electrolyte flow out of the cells during emptying, and prevent electrolyte retention after evacuation thereof from the cell. It is noted that spacer(s) 112 have a mechanical function and do not form any barrier to chemical species in electrolyte 130 such as anions and/or cations.

Figure 2A:
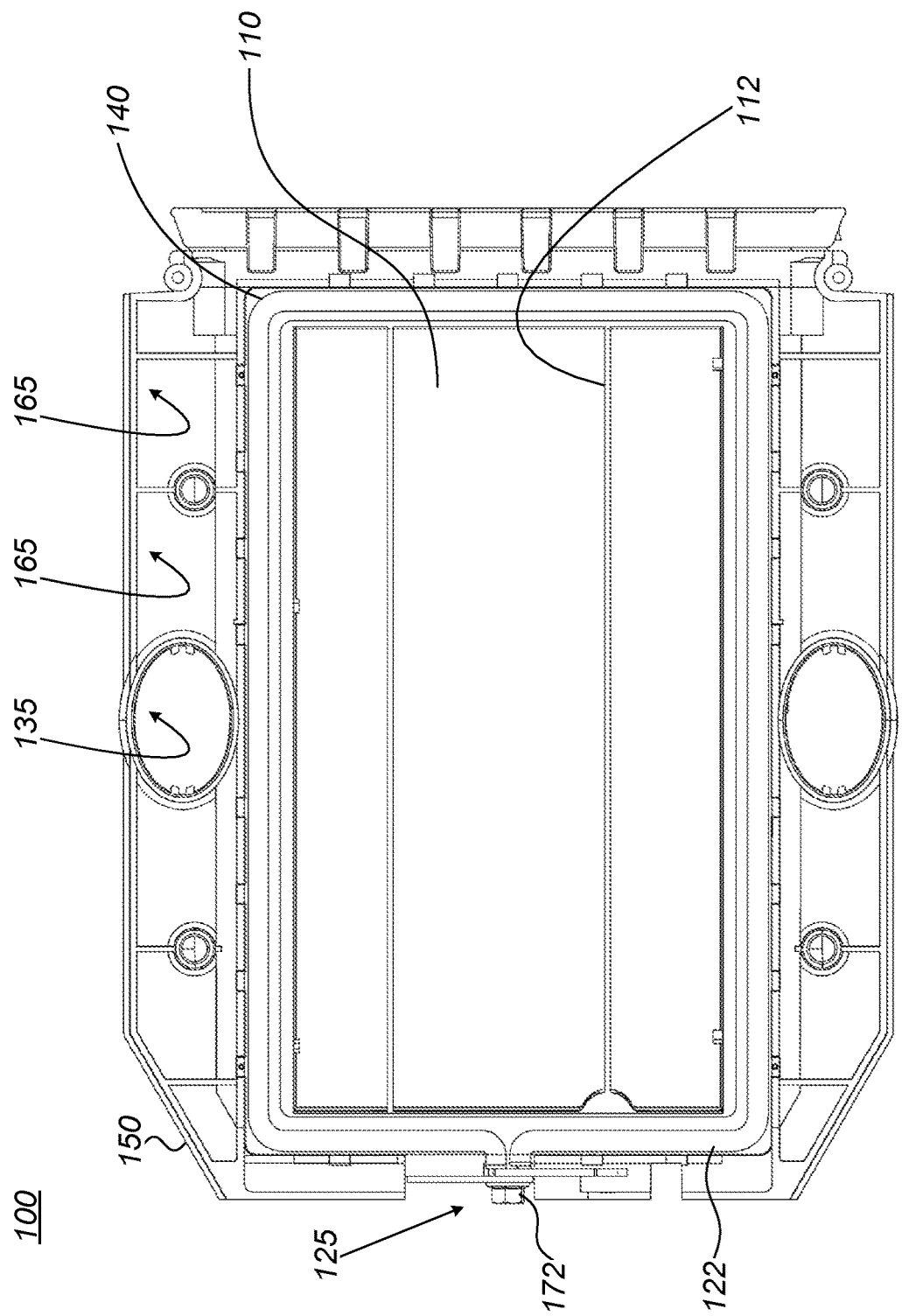
Figure 2B:
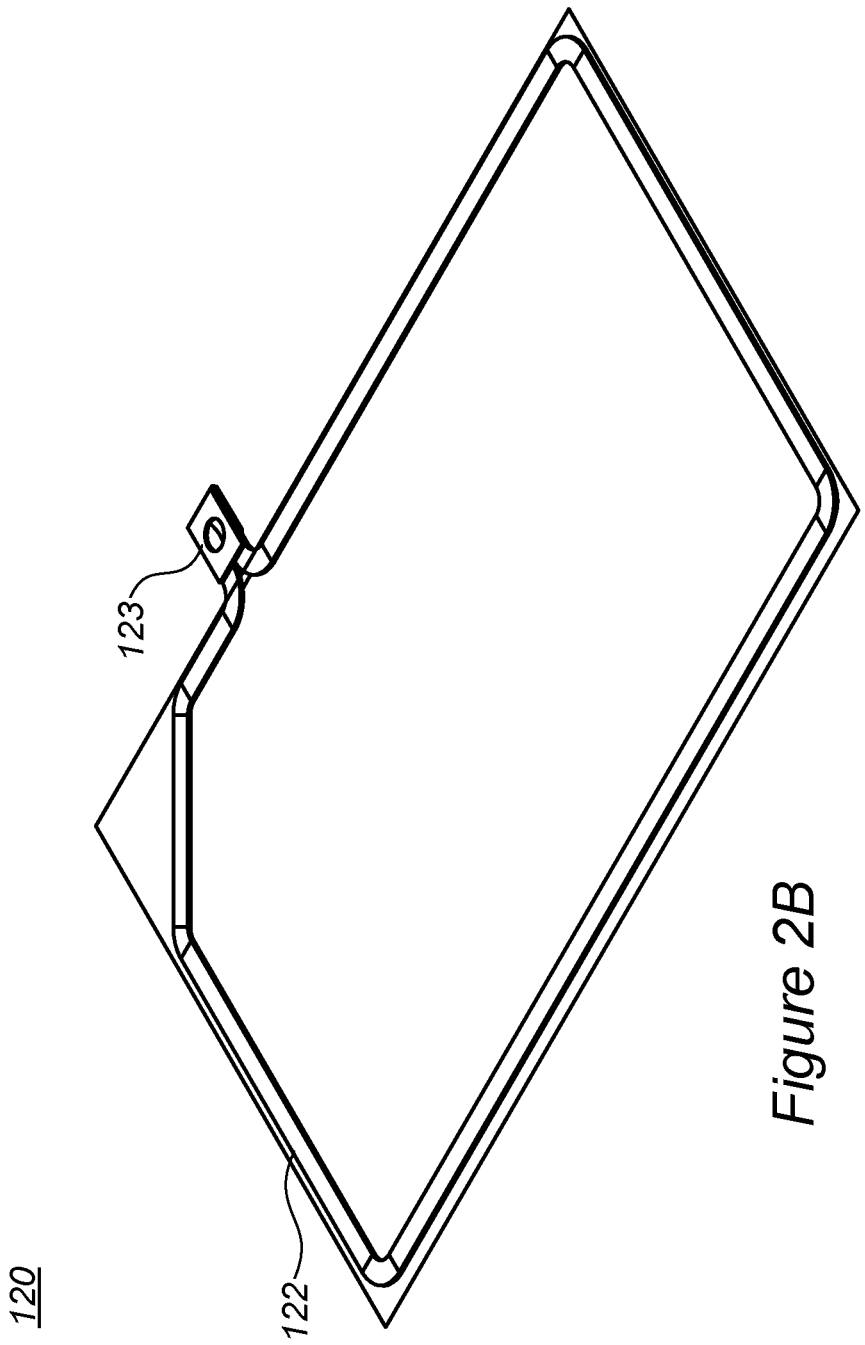
Figure 2C:
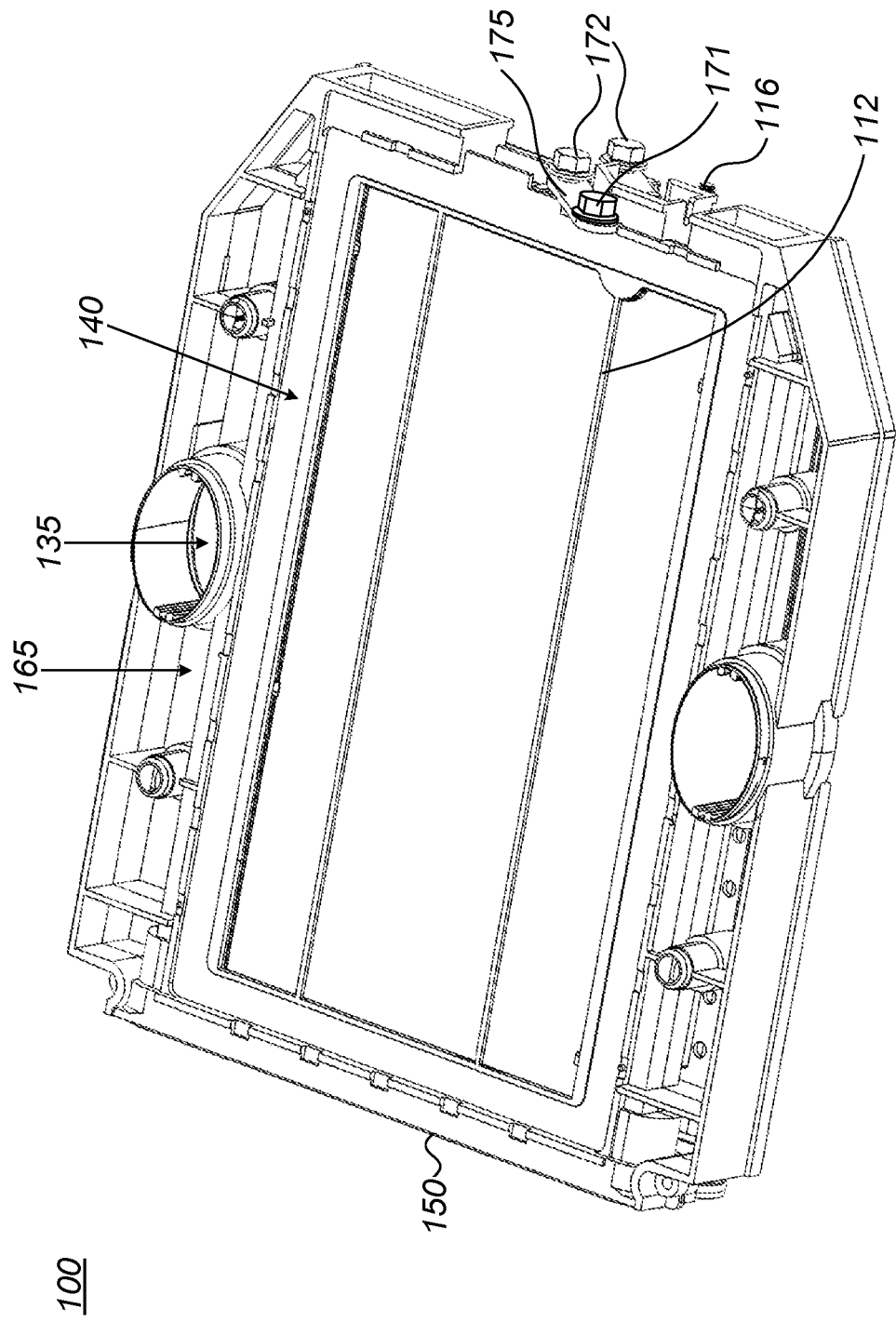
Figure 2D:
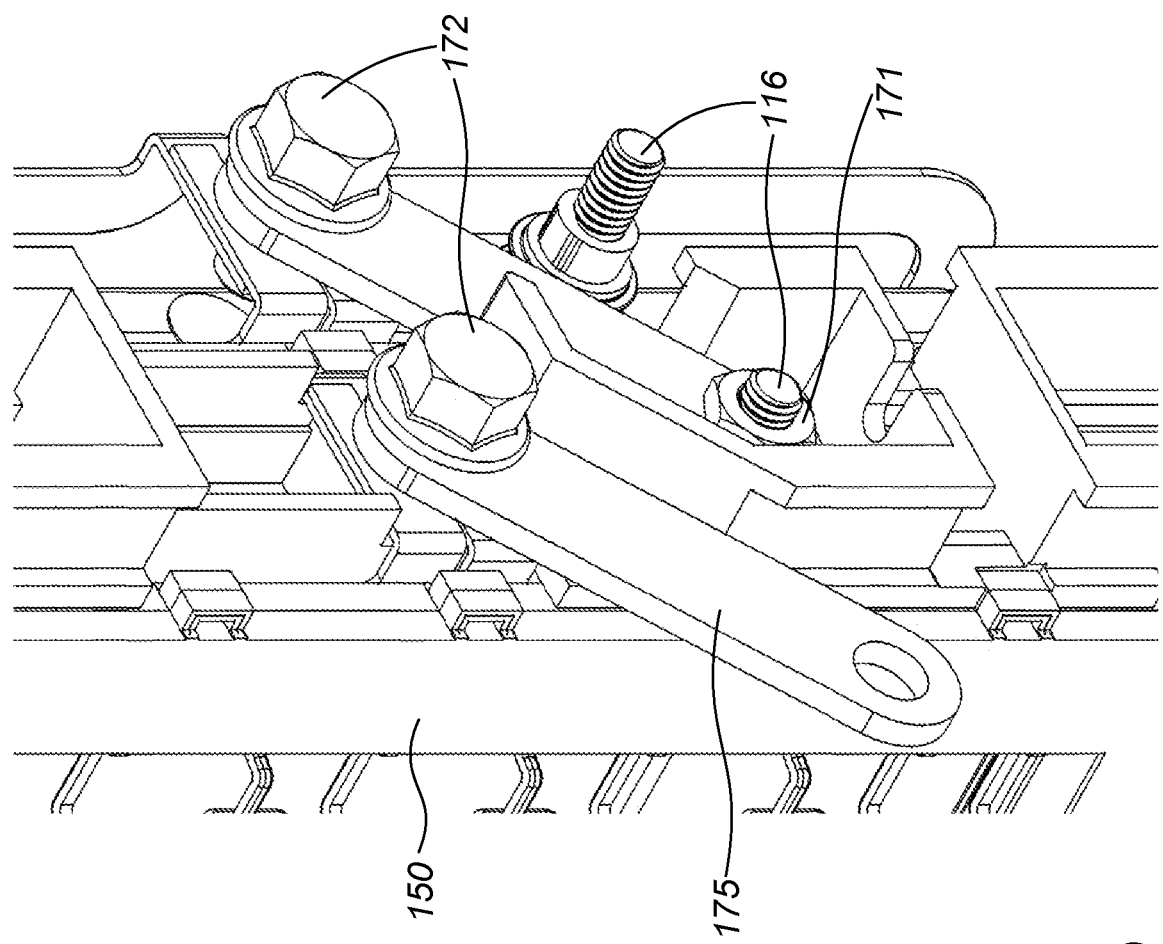

FIGS. 2A-2D are high-level schematic illustrations of aluminum-air battery units 100, according to some embodiments of the invention. FIG. 2A is a side view of housing 150 with spacers 112 and a current collector 122 of cathode 120 (the cathode itself is not shown), FIG. 2B is a perspective view of cathode 120 with current collector 122 attached thereto, FIG. 2C is a perspective view of housing 150 with spacers 112 and electric connectors/fasteners 171, 172 of anode 110 and cathode 120, respectively, and FIG. 2D is an enlarged perspective view of the contacts region. It is noted that different illustrations relate to different embodiments, elements of which can be combined in various ways to yield additional embodiments, and the illustration of features in certain embodiments does not limit the implementation of these features in other embodiments.

In various embodiments, current collector 122 of cathodes 120 may be a rectangular planar sideways-bent strap, rather than prior art cut-out made from a corresponding metal sheet. In certain embodiments, as illustrated in FIGS. 2A and 2B, rectangular planar sideways-bent strap current collector 122 may connect to cathode contact/fastener 172 at a central position 125 on a side of battery unit 100, which advantageously enables production of symmetric cathodes 120, requiring namely production of one instead of two cathode geometries. It is noted that cathode 120 itself is not shown explicitly in FIG. 2A, as it covers illustrated current collector 122, and is illustrated schematically as a surface in FIG. 2B.

FIGS. 2A and 2C provide further illustration of spacers 112, as well as of electrolyte delivery openings 135 and air delivery openings 165. FIG. 2B further illustrates a holder 123, such as a tab, segment or spring, configured to fixate rectangular planar sideways-bent strap current collector 122 and stabilize its shape—to maintain its conformity within housing 150. FIG. 2D schematically illustrates details of the contacts region, showing cathode contact/fastener 172, anode contacts/fastener 171 and connecting tabs 175 in certain embodiments. As disclosed below, certain embodiments comprise multiple battery units 100 attached to each other with corresponding electrochemical cells 105 electrically serially connected and electrolyte openings 135 sealably attached to each other. FIG. 2C schematically illustrates such attachment of two units 100 and FIG. 2D illustrates details of their electrical connections, presenting two cathode connectors/fasteners 172 of two units 100, two studs 116 as anode extensions (see below) to which corresponding anode connectors/fasteners 171 are connected (one shown in FIGS. 2C and 2D) and tabs 175 providing the serial connection from cathode(s) 120 of one unit to anode 110 of the next unit.

Figure 3D:
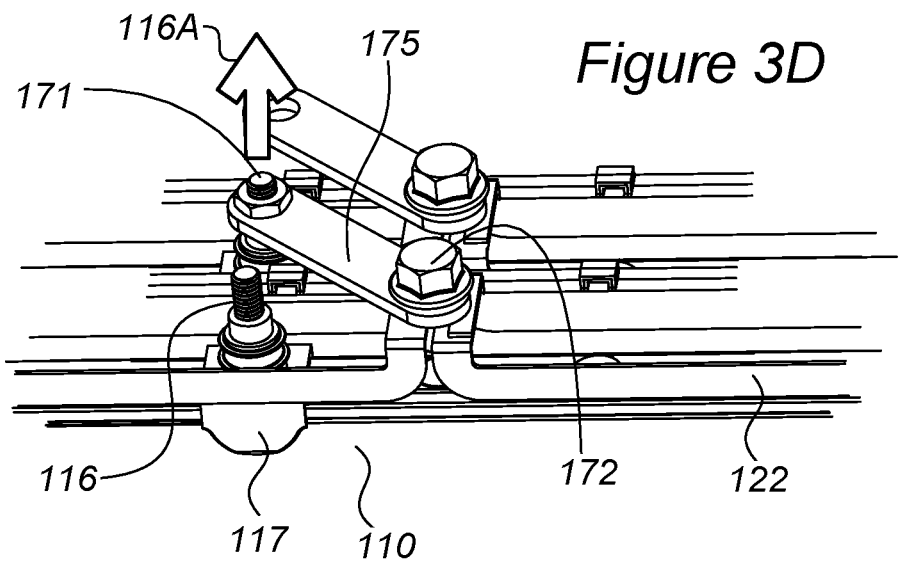
Figure 3E:
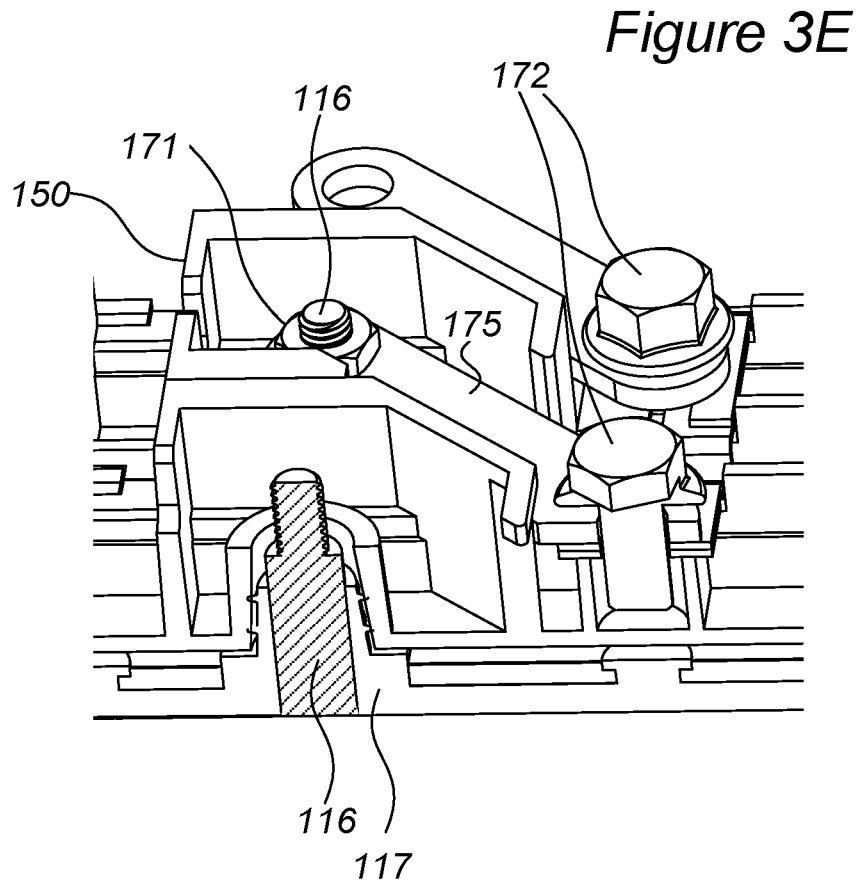
Figure 3F:
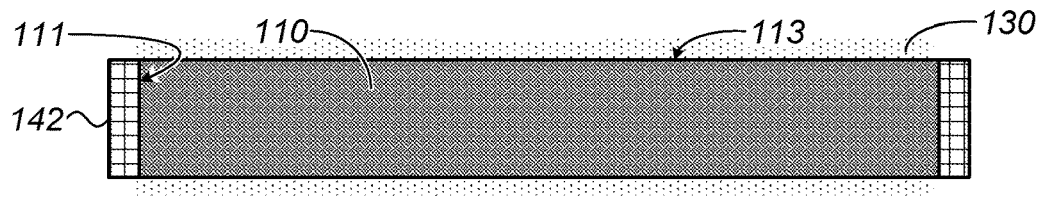
Figure 3F:
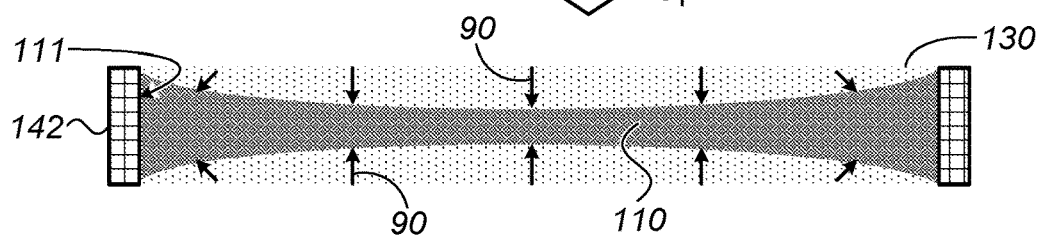
Figure 3G:
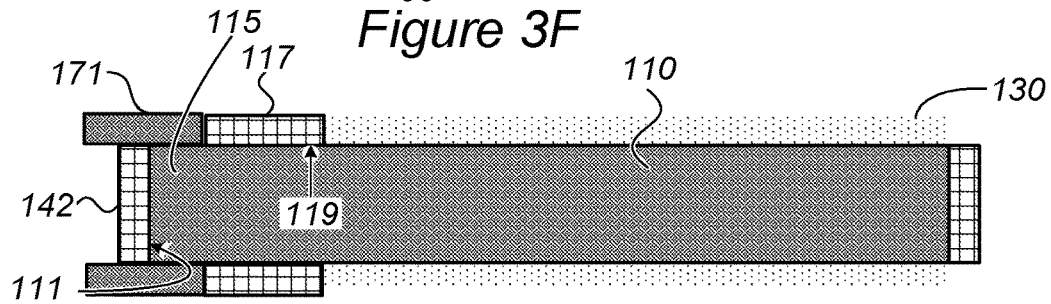
Figure 3G:
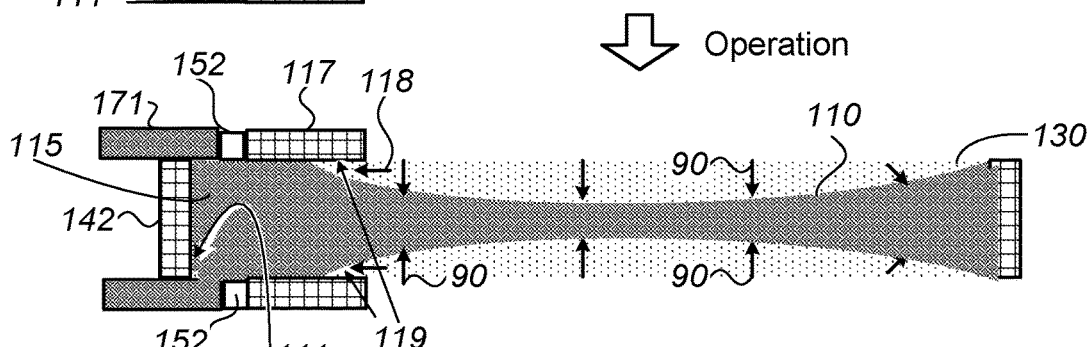
Figure 3H:
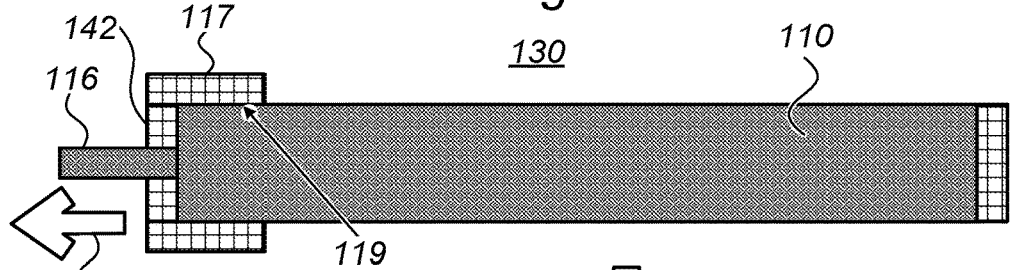
Figure 3H:
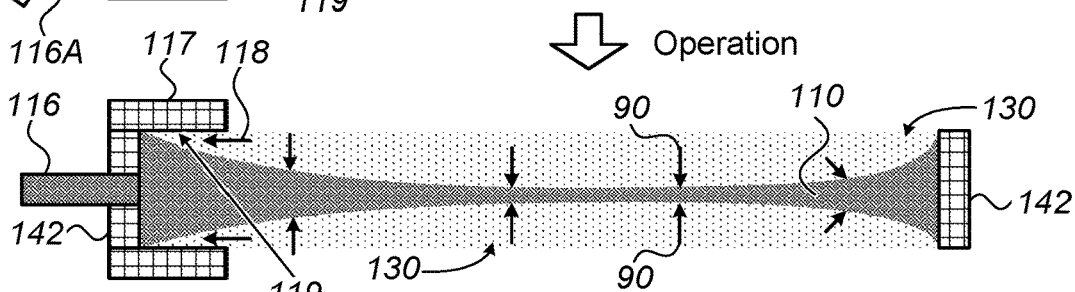

FIGS. 3A-3H are high-level schematic illustrations of parts of aluminum-air battery units 100, according to some embodiments of the invention. FIG. 3A is a partial side view of anode 110 with frame 140, with FIGS. 3B and 3C present a schematic and a detailed enlarged view, respectively of certain embodiments of an anode part 115 to which anode connector/fastener 171 may be connected, with anode part 115 protected by seal 152 and protective strap 117, FIGS. 3D and 3E are a perspective view and a cross section, respectively, of anode part 115 and seal 117 according to different embodiments of battery units 100, and FIGS. 3F-3H are highly schematic cross section views of anode material consumption during operation of the battery and various connection and sealing means, as explained below. As discussed above, the terms seal 117 and protective strap 117 may be replaceable, depending on the geometric configuration and state of anode 110, and may comprise combinations of protective strap 142 and seal 117, as explained below.

In certain embodiments, part 115 of anode 110 may extend outside frame 140, be sealed from contact with electrolyte 130 and be connected to anode connector/fastener 171. It is noted that anode part 115 may be seen as an anode connector (which is physically part of the anode plate but does not take part in the electrochemical processes) and/or as an element to which an anode connector (e.g., a screw, a sleeve, a clasp, a stud etc., note attachment point in FIG. 1A) is attached. For example, anode part 115 may be a triangular corner of rectangular anode 110, as illustrated e.g., in FIGS. 3A-3C, and frame 140 may comprises a seal 117/protective strap 142 in combination with seal 152— configured to prevent electrolyte penetration to anode part 115 during consumption of anode material in operation (see also FIG. 3G). It is noted that as the anode material is consumed, gaps may form between seal/protective strap 117 and the anode surface, which may allow electrolyte to penetrate the anode material and advance toward anode part 115. In order to prevent such gaps to reach anode part 115 and leak and/or damage the conductivity, seal/protective strap 117 may be configured to be at least as wide as half the thickness of anode 110 (for cells 105 on both sides of anode 110), as explained schematically in FIGS. 3G and 3H, below.

In certain embodiments, battery unit 100 may comprise a stud 116 attached to anode 110 and used as anode connector/fastener 171 or connected thereto, as illustrated e.g., in FIGS. 2C, 3D and 3E. For example, stud 116 may be attached externally to a side of anode 110, e.g., by arc stud welding at a specified position which corresponds to an opening in housing 150. In certain embodiments, frame 140 may further comprise seal/protective strap 117 (the side of which, illustrated in FIG. 3D, functions as protective strap 142 while the center of which, illustrated in FIG. 3E functions as a seal, and see FIG. 3H for a schematic illustration) configured to prevent electrolyte penetration to stud 116 (which can be seen as an extension of anode 110 and/or as an anode connector to anode 110) during consumption of anode material in operation. As explained above, seal/protective strap 117 may be configured to be at least as wide as half the thickness of anode 110 (for cells 105 on both sides of anode 110), and/or as the length of the shortest path between the exposed anode surface and the stud connection point.

FIG. 3F illustrates schematically anode material consumption 90 during operation of the battery. Any anode material which is exposed to electrolyte 130 is being consumed during operation of the battery, thinning out anode 110. Protection straps 142 may be configured to prevent electrolyte contact with anode material along sides 111, as long as protection straps 142 contact anode sides 111 snugly. As soon as gaps between protection straps 142 contact anode sides 111 occur (e.g., due to deviant measures of any of the components), electrolyte 130 may enter the gaps and consumption (corrosion) of adjacent anode material commences and broadens the initial gaps.

FIGS. 3G and 3H illustrate schematically two configurations of electric contact configuration between anodes 110 and anode connector/fastener 171 (not shown), FIG. 3G illustrating anode part 115 extending outside frame 140 and sealed from contact with electrolyte 130 by seal/protective strap 117 (see e.g., FIGS. 1B and 3A-3D) and FIG. 3H illustrating stud 116 attached to anode 110 and used as the anode connector or connected thereto (onto which fastener 171 is applied, see e.g., FIGS. 1A, 2A-2D and 3D-3E).

FIG. 3G illustrates schematically that seal 152 and protective strap 117 and both prevents direct leakage of electrolyte 130 and protect a portion 119 of the anode surface from contacting electrolyte 130, respectively. However, as the anode material is consumed during operation, gaps 118 may start to form due to the receding anode surface and electrolyte 130 may enter gaps 118 and consume anode material in a direction approaching anode part 115—posing a risk of electrolyte leakage and damage to the electric contact between anode 110 and the anode connector which may comprise anode part 115 and/or connector/fastener 171. To counter such risk, seal/protective strap 117 may be configured to be at least as wide as half the thickness of anode 110 (for cells 105 on both sides of anode 110, as anode 110 is consumed from both its surfaces facing opposite cathodes 120). In certain embodiments, seal/protective strap 117 may be wider, to increase the safety margins in case of seal misplacement or other inaccuracy in assembling units 100, or possibly narrower if complemented by other straps or seals in unit 100, or if more anode sacrificial material is present which can be corroded without electrolyte leakage.

FIG. 3H illustrates schematically seal/protective element 117 as being adjacent to protective strap 142 and increasing the length of anode material that has to be consumed before electrolyte 130 reaches stud 116 (a case which may result in electrolyte leakage and damage to stud 116 and/or to the electric contact between anode 110 and connector/fastener 171). Seal/protective strap 117 both prevents direct leakage of electrolyte 130 through the edge of anode 110 and protects portion 119 of the anode surface from contacting electrolyte 130. As the anode material is consumed during operation, gaps 118 may start to form due to the receding anode surface and electrolyte 130 may enter gaps 118 and consume anode material in a direction approaching stud 116. To counter the risk of electrolyte 130 reaching stud 116, seal/protective strap 117 may be configured to be at least as wide as half the thickness of anode 110, anode 110 is thick. In certain embodiments, seal/protective strap 117 may be wider or narrower, depending on the geometric configuration and the presence of other sealing/protective elements that increase the distance between the closest point of contact of electrolyte with the anode surface to stud 116 etc. For example, it is noted that when stud 116 is pulled, e.g., by fastener 171, protective strap 142 may function as a seal that prevents electrolyte leakage out of the cell. In certain embodiments, seal/protective strap 117 may be wider, to increase the safety margins in case of seal and/or stud and/or protective strap misplacement or other inaccuracy in assembling units 100.

In certain embodiments, stud 116 may be tightly secured to housing 150 (e.g., forming the connection to anode connector/fastener 171), to yield a force (see arrows 147 in FIGS. 1B and 1C) pressing anode 110 against adjacent protective strap 142 (see arrow 116A in FIGS. 3D, 3E and 3H). For example, stud 116 may comprise an outer winding and be fastened by a nut (possibly also providing the electrical connection, e.g., fastener 171) to apply force 116A. Stud 116 may be tightly secured to housing 150 and/or to tab(s) 175, to further secure an electrical connection thereof to anode 110 and/or to anode connector/fastener 171 and to reduce resistance at the connection thereof.

In certain embodiments, battery unit 100 may further comprise a grid 160 adjacent to cathode 120 (and/or between adjacent cathodes 120) and configured to support airways 161 to cathode 120, as illustrated schematically in FIG. 1F, and in more detail below.

Figure 4A:
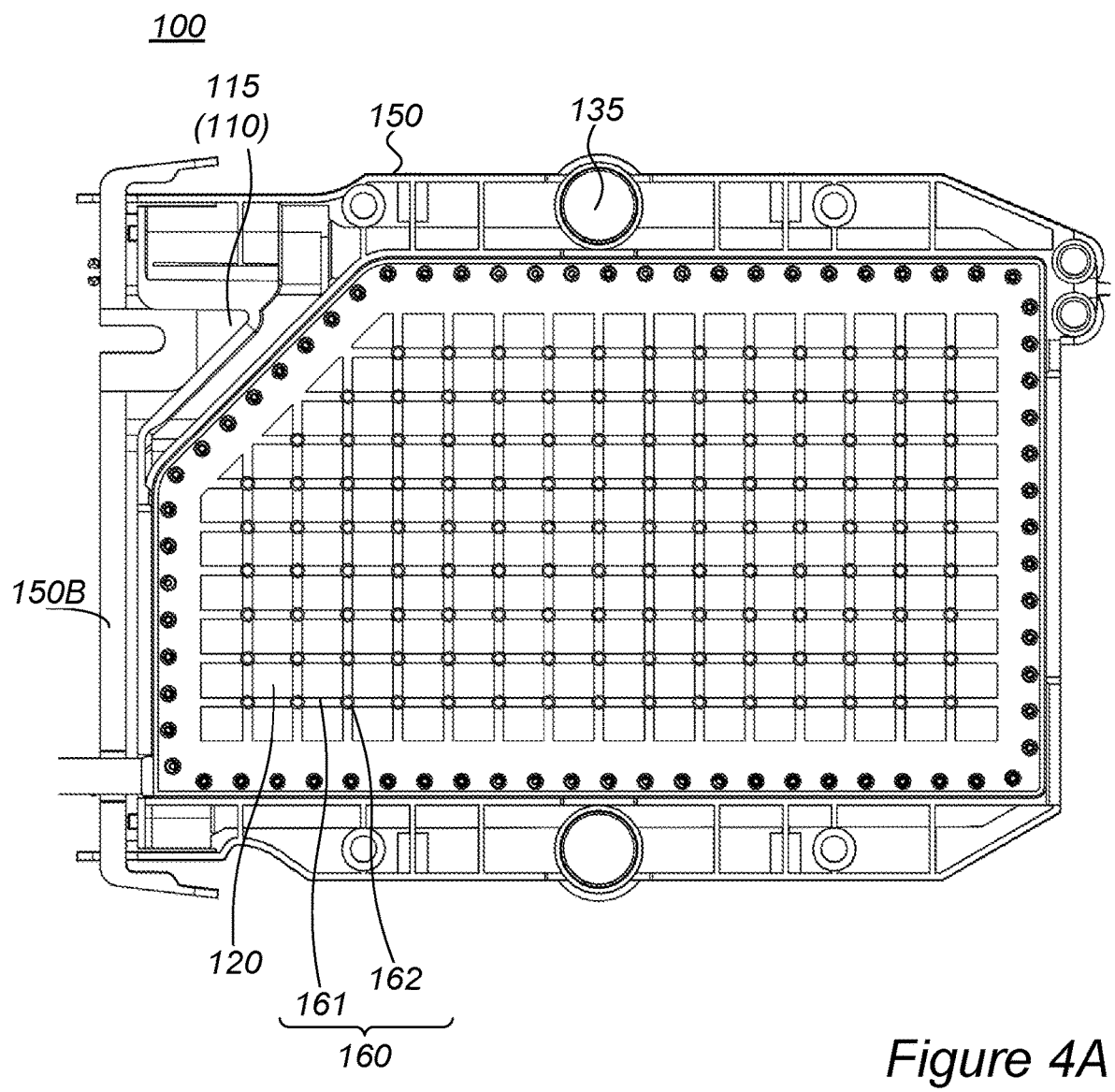
Figure 4B:
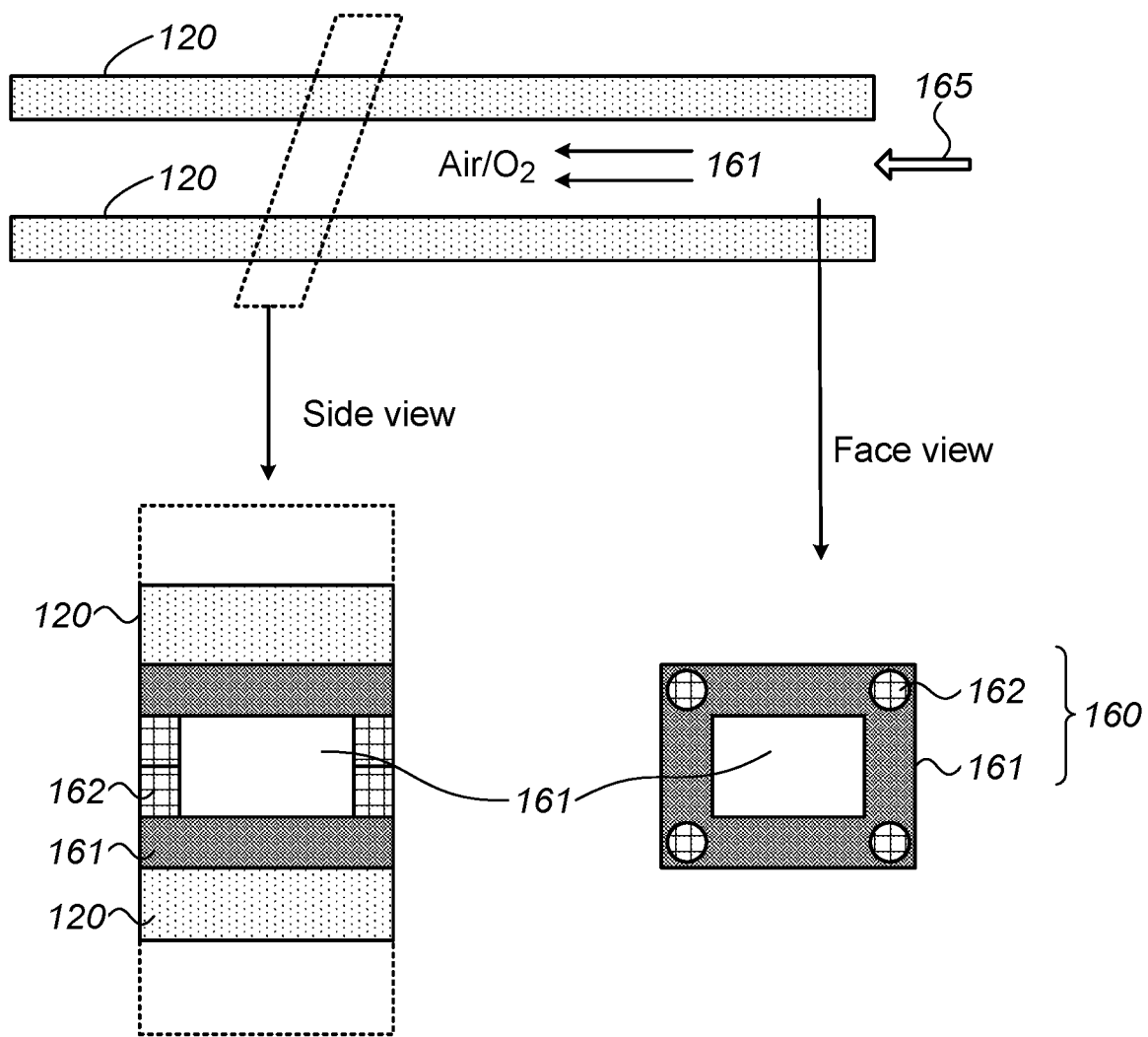
Figure 4C:
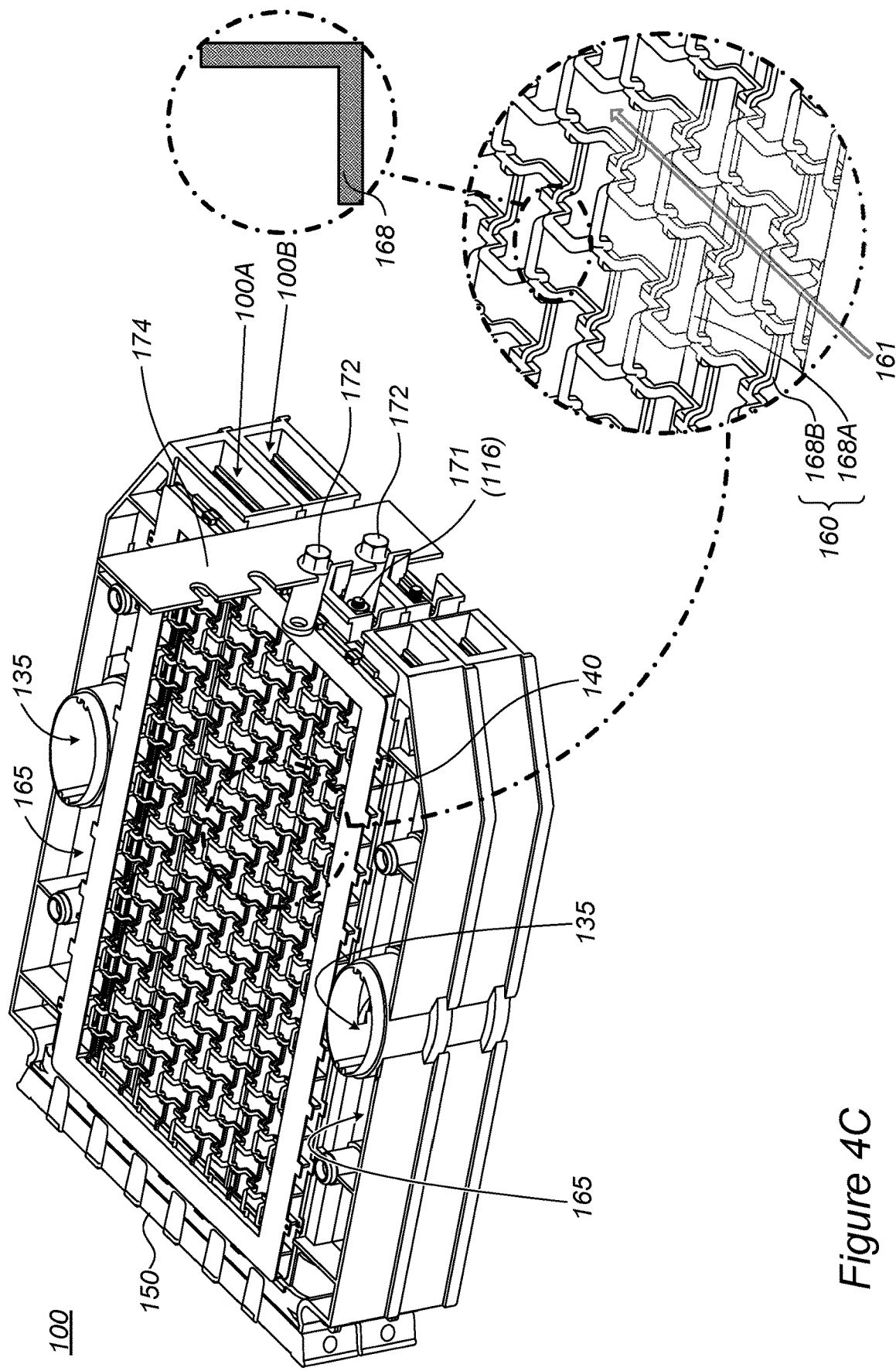
Figure 4D:
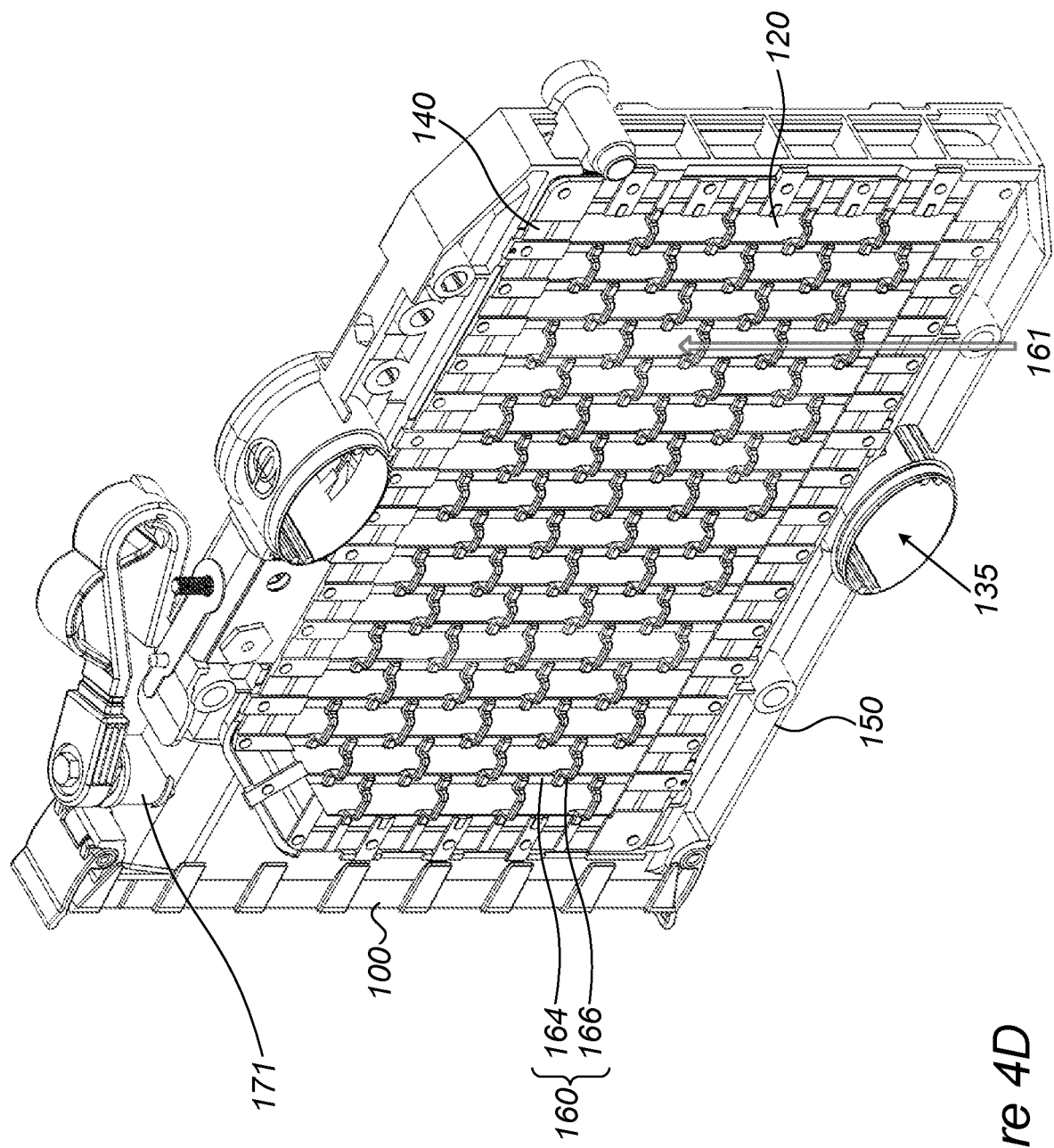

FIGS. 4A-4E are high-level schematic illustrations of various cathode side embodiments of aluminum-air battery units 100, according to some embodiments of the invention. FIG. 4A is a side view, FIG. 4B is highly schematic illustrations of grid construction principles, at cross section and top view, FIG. 4C is a perspective view with details of another grid configuration, and FIGS. 4D and 4E illustrate yet another grid configuration, in perspective and cross section views, respectively. It is noted that different illustrations relate to different embodiments, elements of which can be combined in various ways to yield additional embodiments, and the illustration of features in certain embodiments does not limit the implementation of these features in other embodiments.

In various embodiments, grids 160 are configured to mechanically support an adjacent one of air cathode(s) 120 of units 100 and support airways 161 thereto. While in certain embodiments grids 160 may be made of strong material such as metal, allowing grids 160 to be made very thin and avoid much obstruction to air flowing through airways 161, in some embodiments grids 160 may be made of plastic material (e.g., polypropylene) which is weaker, and therefore requires larger material volume to provide the required mechanical support. In various embodiments disclosed below, the geometrical configuration of grid 160 is optimized to minimize resistance to air flow through airways 161 while maintaining a required level of support of air cathodes 120. In embodiments disclosed below, grid 160 may comprise pairs of complementary grids 160, each supporting one cathode 120 of one unit, each pair complementing the support of adjacent cathodes 120 on both sides of airway 161. In various embodiments, grid 160 may comprise two complementary grids 160 or two complementary grids 160 may be merged into single grid 160 filling airway 161 (see e.g., schematic FIG. 1F).

Any of the disclosed embodiments further comprise aluminum-air battery stacks (not fully shown, represented by pairs of interconnected units 100 as, e.g., in FIGS. 1A, 1F, 2D, 3C-3E and 4E) comprising a plurality of aluminum-air battery units 100, with pairs of air cathodes 120 placed on both sides of each respective anode 110 in each cell 105 and with single grid 160 and or pair of complementary grids 160 configured to mechanically support two adjacent air cathode 120 of corresponding two adjacent units 100 of the stack and support airways 161 thereto.

Multiple non-limiting alternatives or complementary solutions are presented for supporting airways 161 to air cathodes 120 and designing airways 161 to be as broad as possible, while providing stable mechanical structures.

In certain embodiments, illustrated e.g., in FIGS. 4A and 4B, grid 160 may comprise pairs of complementary networks having nodal spacers 162, one associated with each of air cathodes 120, and each comprising a network of rectangles 161 (or other shapes) with knobs 162 as spacers at some or all of the network's nodes. Grids 160 of this type provide a high level of cathode protection and stability and a relatively small obstruction (by spacers 162) to the air flow through airways 161. Nodal spacers 162 of each grid 160 may contact adjacent grid 160 of adjacent battery unit 100 (not shown, illustrated schematically in FIG. 4B) to form rectangular supports to cathodes 120 and rectangular supports to airways 161, as shown schematically in FIG. 4B in top and side views, respectively.

In other examples, FIG. 4C illustrates schematically constructing grid 160 from complementary structures 168A, 168B one associated with each of air cathodes 120, and each comprising a partial undulating network, which in combination form a network (in face view) supporting both cathodes 120. Such grids 160 are advantageous in that they provide structures associated with each cathode 120, yet reduce the amount of obstruction to the air flow through airways 161, as a smaller part of airway 161 is obstructed thereby, as shown schematically by comparison of FIG. 4C and FIG. 4B. Undulating strip networks 168A, 168B of each grid 160 in each direction may complement each other with corresponding undulating strips 168A, 168B of adjacent grid 160 of adjacent battery unit 100 to form rectangular supports to cathodes 120 and L-shaped supports to airways 161 (see the complementary structures in FIG. 4C).

In certain embodiments, adjacent anode and cathode connectors/fasteners 171, 172 advantageously enable implementing control circuits of the battery stack along a single straight PCB (printed circuit board) 174, simplifying construction and control.

Yet additional examples for the construction of grid 160 presented in FIGS. 4D and 4E illustrate complementary structures, each comprising a set of longitudinal strips 164 (e.g., along the direction of airways 161) which are interconnected by connecting elements 166 (e.g., curved or undulating elements 166) that support strips 164 as well as support opposite cathode 120, as illustrated schematically in the cross section view in FIG. 4E, mechanically, reducing the obstruction posed thereby to the air flow through airways 161. Connecting elements 166 of each grid 160 may contact adjacent air cathode 120 of adjacent battery unit 100 (shown in cross section FIG. 4E) to form rectangular supports to cathodes 120 and U-shaped supports to airways 161 (as seen in perspective view in FIG. 4D).

Certain embodiments comprise splitting such grids 160 to be composed of two partial grids (e.g., having some of strips 164 in each part), each of which may be associated and assembled with corresponding cathode 120 (not shown). Elements from different designs may be combined to yield additional designs of grids 160, and grid designs may be varied according to technical considerations, without departing from the scope of the invention.

In any of the configurations, housings 150 of units 100 may comprise sealed and/or protected air passages 165 in fluid communication with airways 161 supported by grids 160 to provide a closed (or substantially closed) air system delivering air or other oxygen containing gas to cathodes 120 and removing used air therefrom. The aluminum-air battery stack made of attached units 100 may have air filtered and pumped into air passages 165, 161, or, alternatively, the aluminum-air battery stack may have an open air system, with airways 161 open to the surrounding atmosphere and passively aerated. The aluminum-air battery stack may be made of multiple units 100 attached to each other with corresponding electrochemical cells 105 electrically serially connected and electrolyte openings 135 sealably attached to each other. Moreover, the aluminum-air battery stack may further be configured to maintain the sealed attachment of electrolyte openings 135 and of aluminum-air battery units 100 upon removal of one or more frame(s) 140 with corresponding anode(s) 100 from corresponding housing(s) 150 of corresponding unit(s) 100. For example, the sealing may be maintained along directions perpendicular to a plane of removed frame(s) 140 and anode(s) 110. Advantageously, disclosed units 100 and stacks enable replacing anodes after depletion with new anodes while maintaining the configuration and sealing of the stack, allowing for quick reactivation of the stack without compromising its performance and further enabling simple maintenance of the stacks.

Any of the disclosed embodiments, as well as combinations and/or variations thereof, may be configured to support airways 161 from air passages 165 (which are in fluid communication therewith) and cathodes 120. Grid 160 may be optimized for maximizing air throughput by increasing the free cross-section to air passage while reducing structural barriers to the air flow, simplifying units' assembly, providing mechanical protection of cathodes 120 during assemble, minimizing production costs, etc.

In various embodiments, electrolyte 130 and/or air may be actively pumped through opening 135 and 165, respectively. Grid 160 may be configured to support cathodes 120 with respect to internal fluid pressure of electrolyte 130 and with respect to pressure differences between electrolyte 130 and actively pumped air or other $O_2$-containing gas to cathodes 120. Additional air filters may be provided in to pumping system (and/or possibly in air openings 165) to ensure clean air supply to cathodes 120.

Elements from FIGS. 1A-4E may be combined in any operable combination, and the illustration of certain elements in certain figures and not in others merely serves an explanatory purpose and is non-limiting.

Figure 5:
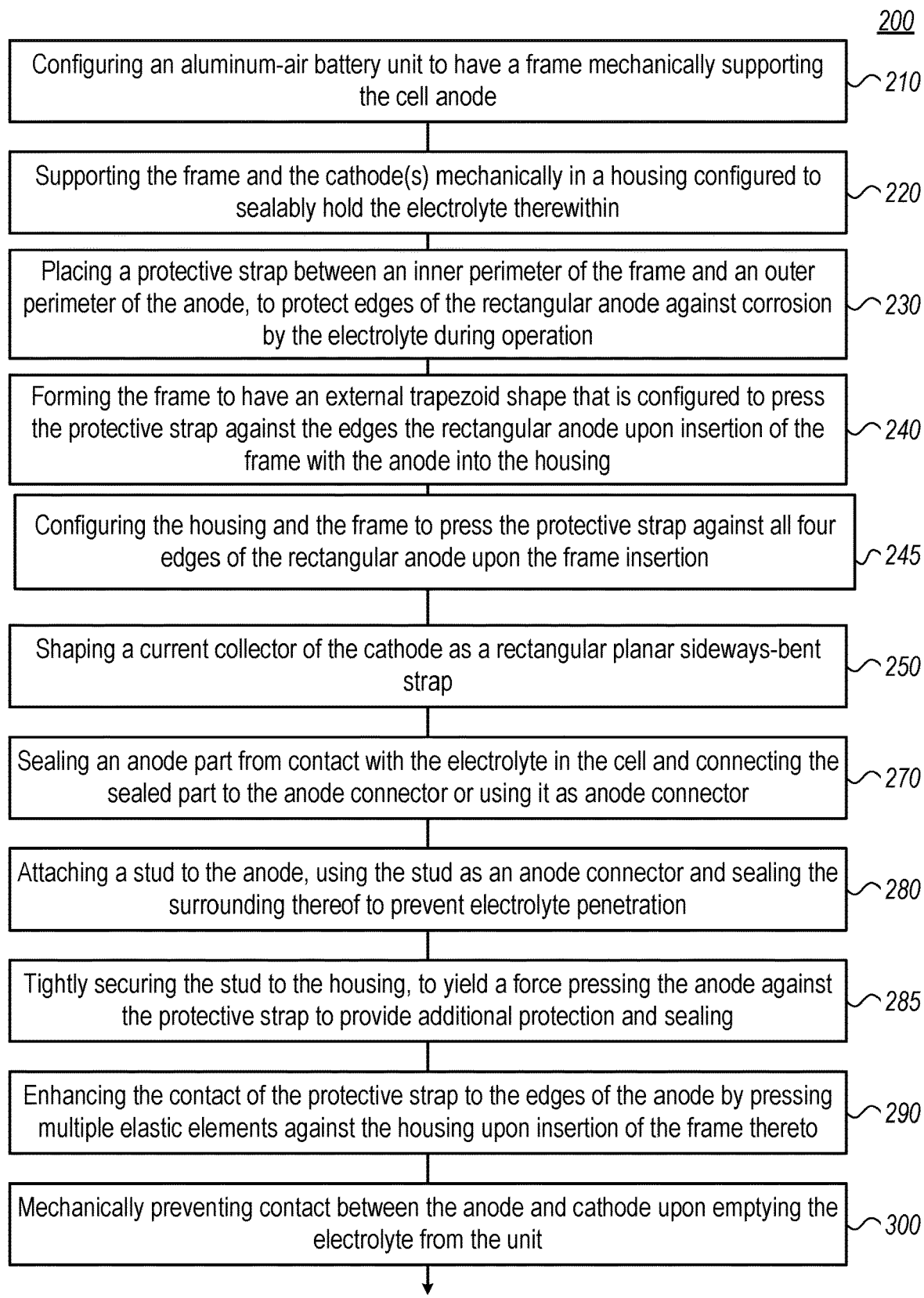
FIG. 5 is a high-level flowchart illustrating a method, according to some embodiments of the invention.
Figure 5:
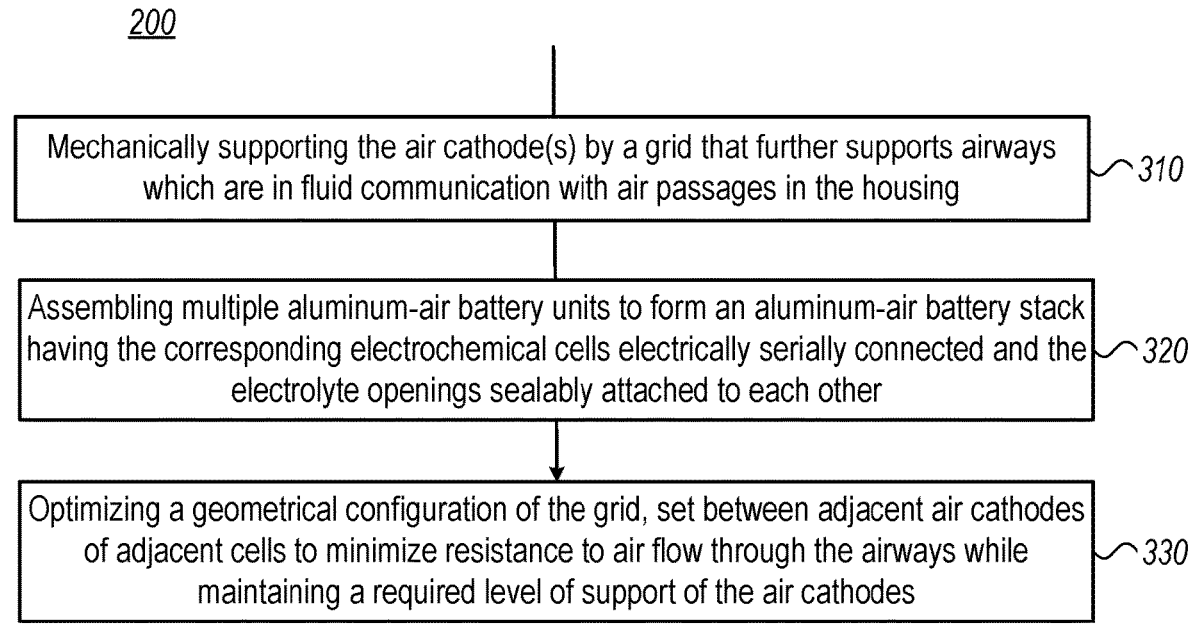

FIG. 5 is a high-level flowchart illustrating a method 200, according to some embodiments of the invention. The method stages may be carried out with respect to units 100 described above, which may optionally be configured to implement method 200. Method 200 may comprise the following stages, irrespective of their order.

Method 200 comprises configuring an aluminum-air battery unit, comprising an aluminum-air electrochemical cell comprising a rectangular aluminum anode, at least one air cathode and alkaline electrolyte, to have a frame mechanically supporting the anode of the cell (stage 210), supporting, mechanically, the frame and the air cathode(s) in a housing configured to sealably hold the electrolyte therewithin in fluid communication with openings in the for receiving delivered electrolyte (stage 220), placing a protective strap between an inner perimeter of the frame and an outer perimeter of the anode (stage 230), configured to protect edges of the rectangular anode against corrosion by the electrolyte during operation, and forming the frame to have an external trapezoid shape that is configured to press the protective strap against the edges the rectangular anode upon insertion of the frame with the anode into the housing (stage 240), e.g., to fit into a trapezoid cavity in the housing and/or to be pressed by a click connection between the frame and the housing. In certain embodiments, method 200 may comprise configuring the housing and the frame to press the protective strap against all four edges of the rectangular anode upon insertion of the frame with the anode into the housing (stage 245).

Method 200 may further comprise shaping a current collector of the air cathode(s) as a rectangular planar sideways-bent strap (stage 250).

In certain embodiments, method 200 may comprise sealing a part of the rectangular anode from contact with the electrolyte in the cell and connecting the sealed part to an anode connector or using it as anode connector (stage 270). For example, method 200 may comprise selecting the sealed part as a triangular corner of the rectangular anode, and preventing electrolyte penetration to the anode part during consumption of anode material in operation.

In certain embodiments, method 200 may comprise attaching a stud to the anode, using the stud as an anode connector (or connecting it thereto) and sealing a surrounding of the stud to prevent electrolyte penetration to the stud during consumption of anode material in operation (stage 280) and optionally tightly securing the stud to the housing, to yield a force pressing the anode against the protective strap (stage 285), provide additional protection and sealing and to secure an electrical connection thereof to the anode and/or to the anode connector.

Method 200 may further comprise enhancing a contact of the protective strap to the edges of the anode by pressing a plurality of elastic elements against the housing upon insertion of the frame thereto (stage 290).

In certain embodiments, method 200 may comprise mechanically preventing contact between the anode and the air cathode(s) upon emptying the electrolyte from the unit (stage 300).

In certain embodiments, method 200 may comprise mechanically supporting the air cathode(s) by a grid that further supports airways to the air cathode(s), which are in fluid communication with air passages in the housing, adjacent to the cathode to support airways thereto (stage 310). In various embodiments, the grid may be constructed as any of: complementary networks having nodal spacers and/or a plurality of strips in one direction that are interconnected by undulating strips and/or connecting elements in another direction and/or a pair of complementary structures that together form the grid; as well as combined configurations of the complementary grids.

In certain embodiments, method 200 may further comprise assembling multiple aluminum-air battery units to form an aluminum-air battery stack having the corresponding electrochemical cells electrically serially connected and the electrolyte openings sealably attached to each other (stage 320).

In certain embodiments, method 200 may further comprise assembling multiple aluminum-air battery units to form an aluminum-air battery stack having the corresponding electrochemical cells electrically serially connected and the electrolyte openings sealably attached to each other, wherein each cell comprises two air cathodes on either side of the respective anode, and optimizing a geometrical configuration of the grid, set between adjacent air cathodes of adjacent cells (stage 330), to minimize resistance to air flow through the airways while maintaining a required level of support of the air cathodes.

Certain embodiments comprise a shut-down procedure which includes introducing a stopping liquid (e.g., acidic liquid in an alkaline metal air cell) into unit 100 when the operation of the cell is ceased, in order to prevent further corrosion of anode 110, or other unwanted reactions. In order to stop operation of the metal air battery, it may be required to introduce a stopping material into the cell. For example, when stopping an alkaline aluminum air cell, electrolyte 130 may be drained out of unit 110, in order to prevent further corrosion of anode 110. Furthermore, acidic material may be added into the cell in order to neutralize the remains of the alkaline electrolyte in the cell or on the surface of the anode. Certain embodiments comprise introducing an acidic solution through openings 135, after draining electrolyte 130 from housing 150. Spray nozzles may be used to spray the acidic material into the gap between anode 110 and cathode 120, and onto surface 113 of anode 110. The stopping liquid inlet cell may include a one-way valve for preventing electrolyte 130 from flowing out of the cell through the stopping liquid inlet.

Advantageously, disclosed battery units 100 are replaceable, and disclosed frames 140 holding anode 110 and cathode 120 is replaceable within housing 150 as well. Moreover, disclosed battery units 100 protect parts of anodes 110 which are used to provide the electrical contact from dissolving due to electrolyte contact, preventing electrical and mechanical difficulties due to inconsistencies in the physical dimensions of the battery elements. Disclosed battery units 100 also provide sufficient protection and sealing around the metal anode, while avoiding the creation of friction upon frame insertion into housing 150, e.g., by the complementary trapezoidal shapes and use of smooth plastic-to-plastic between frame 140 and housing 150. Finally, disclosed battery units 100 optimize the use of the anode material in production and therefore the efficiency and power provided by the battery. Additional advantages of disclosed units 100 and methods 200 comprise enabling a relatively cheap production process, easy maintenance (e.g., simple insertion and extraction of anode 110 to and from housing 150 using frame 140 while providing good sealing against electrolyte leakage) and improved mechanical and electrical connection to the anodes throughout its entire lifetime without experiencing degradation as the anode is consumed.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. An aluminum-air battery unit comprising:
    at least one aluminum-air electrochemical cell comprising a rectangular aluminum anode, at least one corresponding air cathode, and alkaline electrolyte,
    a frame configured to mechanically support the anode of the cell, and
    a housing configured to support mechanically the frame and the at least one air cathode and to sealably hold the electrolyte within the housing, wherein the housing comprises openings for receiving delivered electrolyte;
    wherein the frame comprises a protective strap configured to protect edges of the rectangular anode against corrosion by the electrolyte during operation, and
    wherein the frame has an external trapezoid shape that is configured to press the protective strap against the edges of the rectangular anode upon insertion of the frame with the anode into the housing.

2. The aluminum-air battery unit of claim 1, wherein the external trapezoid shape of the frame is configured to fit into a trapezoid cavity in the housing.

3. The aluminum-air battery unit of claim 1, wherein the housing is configured to receive the frame by a click connection to the external trapezoid shape of the frame which is configured to press the protective strap against the edges of the rectangular anode.

4. The aluminum-air battery unit of claim 1, wherein the housing comprises at least two parts configured to enclose the frame snuggly.

5. The aluminum-air battery unit of claim 1, wherein the housing and the frame are configured to press the protective strap against all four edges of the rectangular anode upon insertion of the frame with the anode into the housing.

6. The aluminum-air battery unit of claim 1, wherein the at least one air cathode comprises a current collector that is a rectangular planar sideways-bent strap.

7. The aluminum-air battery unit of claim 1, further comprising at least one spacer configured to mechanically prevent contact between the anode and cathode upon emptying the electrolyte from the unit.

8. The aluminum-air battery unit of claim 1, wherein a part of the anode extends outside the frame, is sealed from contact with the electrolyte in the cell, and is used as an anode connector.

9. The aluminum-air battery unit of claim 8, wherein the part of the anode extending outside the frame is a triangular corner of the rectangular anode, and the frame comprises a seal configured to prevent electrolyte penetration to the anode part during consumption of anode material in operation.

10. The aluminum-air battery unit of claim 9, wherein the seal has a width which is at least half a thickness of the anode.

11. The aluminum-air battery unit of claim 1, further comprising a stud attached to the anode and is used as an anode connector.

12. The aluminum-air battery unit of claim 11, wherein the frame further comprises a seal configured to prevent electrolyte penetration to the stud during consumption of anode material in operation.

13. The aluminum-air battery unit of claim 12, wherein the seal has a width which is at least half a thickness of the anode.

14. The aluminum-air battery unit of claim 11, wherein the stud is tightly secured to the housing, to yield a force pressing the anode against the protective strap and to secure an electrical connection thereof to the anode.

15. The aluminum-air battery unit of claim 1, wherein the frame further comprises a plurality of elastic elements configured to be pressed against the housing upon insertion of the frame thereto, and enhance a contact of the protective strap to the edges of the anode.

16. The aluminum-air battery unit of claim 1, further comprising at least one grid configured to mechanically support an adjacent one of the at least one air cathode of the unit and support airways thereto.

17. An aluminum-air battery stack comprising a plurality of the aluminum-air battery units of claim 16, wherein the at least one air cathode comprises two air cathodes placed on both sides of the respective anode in each cell and wherein each battery unit comprises a single grid configured to mechanically support two adjacent air cathodes of corresponding two adjacent units of the stack and support airways thereto.

18. The aluminum-air battery unit of claim 1, wherein the at least one air cathode comprises two air cathodes placed on both sides of the respective anode in each cell and further comprising two grids adjacent to and configured to mechanically support the corresponding two air cathodes and support airways thereto.

19. A method comprising:
configuring an aluminum-air battery unit, comprising an aluminum-air electrochemical cell comprising a rectangular aluminum anode, at least one air cathode and alkaline electrolyte, to have a frame mechanically supporting the anode of the cell,
supporting mechanically the frame and the at least one air cathode in a housing configured to sealably hold the electrolyte therewithin in fluid communication with openings in the housing for receiving delivered electrolyte,
placing a protective strap between an inner perimeter of the frame and an outer perimeter of the anode, configured to protect edges of the rectangular anode against corrosion by the electrolyte during operation, and
forming the frame to have an external trapezoid shape, that is configured to press the protective strap against the edges of the rectangular anode upon insertion of the frame with the anode into the housing.

20. The method of claim 19, further comprising sealing a part of the rectangular anode from contact with the electrolyte in the cell and connecting the sealed part to an anode connector.

* * * * *